United States Patent [19]

McLaughlin

[11] Patent Number: 5,867,382
[45] Date of Patent: Feb. 2, 1999

[54] GENERIC CONTROL SYSTEMS USING A VIRTUAL RACK MODULE

[76] Inventor: Michael G. McLaughlin, 14661 New Rochester Rd., Pemberville, Ohio 43450

[21] Appl. No.: 707,919

[22] Filed: Sep. 10, 1996

[51] Int. Cl.[6] .................................................. G05B 11/01
[52] U.S. Cl. ..................... 364/146; 364/147; 395/651; 395/182.01
[58] Field of Search .................... 364/130–148, 364/900, 191, 192; 395/155, 575; 340/172

[56] References Cited

U.S. PATENT DOCUMENTS

| | | | |
|---|---|---|---|
| 3,942,158 | 3/1976 | Dummermuth | 340/172.5 |
| 4,037,212 | 7/1977 | Nomiya et al. | 395/651 |
| 4,165,534 | 8/1979 | Dummermuth et al. | 364/900 |
| 4,302,820 | 11/1981 | Struger et al. | 364/900 |
| 4,991,076 | 2/1991 | Zifferer et al. | 364/147 |
| 5,157,595 | 10/1992 | Lovrenich | 364/136 |
| 5,168,441 | 12/1992 | Onarheim et al. | 364/146 |
| 5,225,974 | 7/1993 | Mathews et al. | 364/140 |
| 5,237,652 | 8/1993 | McManus | 395/155 |
| 5,243,511 | 9/1993 | Zifferer et al. | 364/147 |
| 5,267,145 | 11/1993 | Zifferer et al. | 364/191 |
| 5,285,376 | 2/1994 | Struger et al. | 364/147 |
| 5,295,059 | 3/1994 | Brooks et al. | 364/147 |
| 5,321,829 | 6/1994 | Zifferer | 395/575 |
| 5,349,518 | 9/1994 | Zifferer et al. | 364/192 |
| 5,450,576 | 9/1995 | Kennedy | 395/652 |

*Primary Examiner*—Paul P. Gordon
*Assistant Examiner*—Sheela S. Rao
*Attorney, Agent, or Firm*—MacMillan, Sobanski & Todd, LLC

[57] ABSTRACT

A Virtual Rack module for a programmable logic controller. The Virtual Rack module comprises a subroutine written using a programming language understandable to the programmable logic controller, preferably using the relay ladder logic programming language. The main control program and the Virtual Rack module are compiled on the programming terminal connected to the programmable logic controller and then downloaded into the memory of the programmable logic controller. Once downloaded, the programmer can use configuration screens generated by the Virtual Rack module and displayed on the programming terminal to configure various input and output devices independent of when and where the input and output devices are connected to the programmable logic controller.

35 Claims, 31 Drawing Sheets

VRACK

| Module Type | Total # of Channels per slot | Total # of Slots supported | Total # of Virtual I/O Channels |
|---|---|---|---|
| Digital In | 16 | 277 | 3072 |
| Digital Out | 16 | 277 | 3072 |
| Analog In | 8 | 170 | 960 |
| Analog Out | 4 | 277 | 960 |
| "Flex" Analog Out | 4 | 277 | 960 |
| 16/16 I/O Block | 32 | 277 | 6144 |
| VHSC pulse counter module | 4 | 030 | 96 |

Figure 8

Digital Out

Analog In

Analog out [forcing signal utility]

Flex Aout

Flex Aout [forcing signal utility]

VHSC Module [very high speed counter]

GENERIC CONTROL SYSTEMS USING A VIRTUAL RACK MODULE

BACKGROUND OF THE INVENTION

1. Field of the Invention

The invention relates in general to methods of developing ladder logic programs for Programmable Logic Controllers (PLCs). In particular, the invention provides a method of creating a "generic" control system for automating the configuration of I/O modules, and more importantly, the automatic generation of I/O channels for allowing the assignment and configuration of the I/O module at runtime.

2. Related Art

Programmable logic controllers (PLCs) perform many of the control functions for assembly line machines, machine tools, and other types of industrial equipment in accordance with a stored program. The control program comprises a series of process control instructions that are read out and executed to examine the condition of selected sensing devices on the controlled equipment, and to energize or deenergize selected operating devices. A typical PLC, such as a type manufactured by Allen-Bradley Company, is capable of executing a number of categories of instructions, including a standard set of arithmetic, logical, move, diagnostic, register, comparison, and data transfer instructions as in any computer.

The International Electrotechnical Commission (IEC) 1131 committee has developed a common set of programming interfaces and four basic languages for programming PLCs, regardless of the manufacturer. The four basic languages are ladder diagram (ladder logic), instruction list, structured text, and function block diagram. A fifth basic language, sequential function charts, is used within the four basic languages.

Electrical engineers write most of the control software using the ladder logic programming language. Ladder logic originated with electricians and electrical maintenance operations and, although adapted, ladder logic still uses a standardized set of symbols from that discipline to represent electrical sequences of operations. A series of electrical relay contacts, timer, counters and the like, are laid out in software to control various hardware field devices.

Ladder logic diagrams are used to represent the interconnections of field devices in such a way that the activation of one device could turn on another according to a predetermined sequence of events. It starts at the top of a sequence of actions, then moves down in steps. Once completed, it repeats the whole sequence.

Instruction list is a low-level language similar to assembler language. Only one operation, such as storing a value in a register, is allowed per line of coding. It is useful for smaller applications or for optimizing parts of an application.

Structured text is a high-level block structure language that has a syntax that resembles Pascal. It can be used to express complex statements involving variables representing a wide range of different types of data, including analog and digital values. There also are specific data types for the management of time, dates, and durations, which are important to batch processing applications.

Function block diagram is a graphical language that allows program elements that appear as blocks to be "wired" together in a form similar to a circuit diagram. Function blocks are standard blocks that execute algorithms such as for equipment in a Process Instrument Diagram (PID). Function block diagrams are well-suited for applications that involve the flow of information or data between control components.

A language that pervades all other languages is sequential function chart (SFC). This graphical language is a way of organizing programs written in the other four in such a way as to accomplish sequential control. SFC provides a diagrammatic representation of program sequences. It supports alternative sequence selections and parallel sequences.

Typically, the industry uses a standard approach to design an automated control system using various proprietary hardware in conjunction with customized software. This standard approach has serious drawbacks. First, the proprietary hardware will eventually become obsolete because a change of hardware usually necessitates a corresponding change in the control system. Second, minor changes from site to site can result in short term delays due to recoding and debugging. As a result, long term cost increases because many different versions or multiple control systems of the same control system generating a complex support problem. Third, there is no consistent performance or data from the multiple control systems because each control system is not identical. Finally, in a hard-wired, hard-coded system, the end user has little ability to modify the system to meet the changing needs of the end user.

In view of the foregoing, it is an object of the invention to provide a method of producing a generic control system designed to work with any hardware in the control system by using a Virtual Rack I/O module. The generic control system is both very capable and highly configurable to the specific task. To produce a generic, robotic paint control system, for example, the generic control system would consider all variations to the theme found in the entire scope of that industry. The generic control system would include all types of hardware interfacing, control strategy as well as considering the variables in the product to be painted. With the generic control system, understanding the control system is no longer a concern to the end user, the end user needs only to "configure" the generic control system to generate a specific control system that performs the required task.

Because the I/O hardware and wiring are separate from the control logic, the generic approach of a generic control system using the Virtual Rack I/O module has several distinct advantages from the standard approach. First, future changes in hardware can be accommodated by the system without modifying the software. Second, a generic control system does not compromise the control system design or scope. Third, a generic control system can be installed as an upgrade to an existing automated control system without risk or overhead to the end user. Fourth, a generic control system provides one standard control system for a wide variety of applications, thereby reducing cost while ensuring site-wide consistent performance and data. Fifth, a generic control system is highly configurable so that the end user has the power and flexibility to modify hardware, control strategy or scope by changing the system's configuration. Finally, a generic control system does not need to be modified and can be rapidly installed from site to site.

SUMMARY OF THE INVENTION

To achieve these and other objects of the invention, the invention comprises a method of producing a generic control system using a Virtual Rack I/O module. Once all the hardware has been installed, the end user executes the Virtual Rack module and instructs the system as to what input/output (I/O) is installed and where it is located. The Virtual Rack module allows the end user to make software-to-hardware connections at runtime, rather than during the programming as in conventional systems. Once the end user has configured the Virtual Rack I/O, the user then goes to more configuration screens to configure the control algorithms. Once the generic system is created, it no longer requires programming, it only requires configuration.

The preferred embodiment of the method of the invention comprises the steps of installing a main control program including a Virtual Rack module in a programmable logic controller and configuring a module type connected to the programmable logic controller by using at least one configuration screen generated by the Virtual Rack module. The Virtual Rack module allows the selected module type to be configured by the programmer independent of when and where the selected module type was installed in the programmable logic controller.

The preferred embodiment of the apparatus of the invention comprises a programming terminal having a data storage device for storing a set of program instructions from a main control program that includes a Virtual Rack module and a programmable logic controller connected to said programming computer. The programmable logic controller includes a memory for storing the set of program instructions from the programming terminal and a microprocessor for processing the set of program instructions stored in the memory. The generic control system is created when the main control program, including the Virtual Rack module, is downloaded from the programming terminal to the programmable logic controller.

These and other aspects and advantages of the invention are described or apparent from the following detailed description of the preferred embodiments and appended drawings wherein like reference numbers refer to the same element, feature or component.

BRIEF DESCRIPTION OF THE DRAWINGS

The preferred embodiments are described with reference to the drawings in which:

FIG. 8 shows a block diagram of various I/O module type specifications of the Virtual Rack module;

DETAILED DESCRIPTION OF THE PREFERRED EMBODIMENTS

Figure 1:
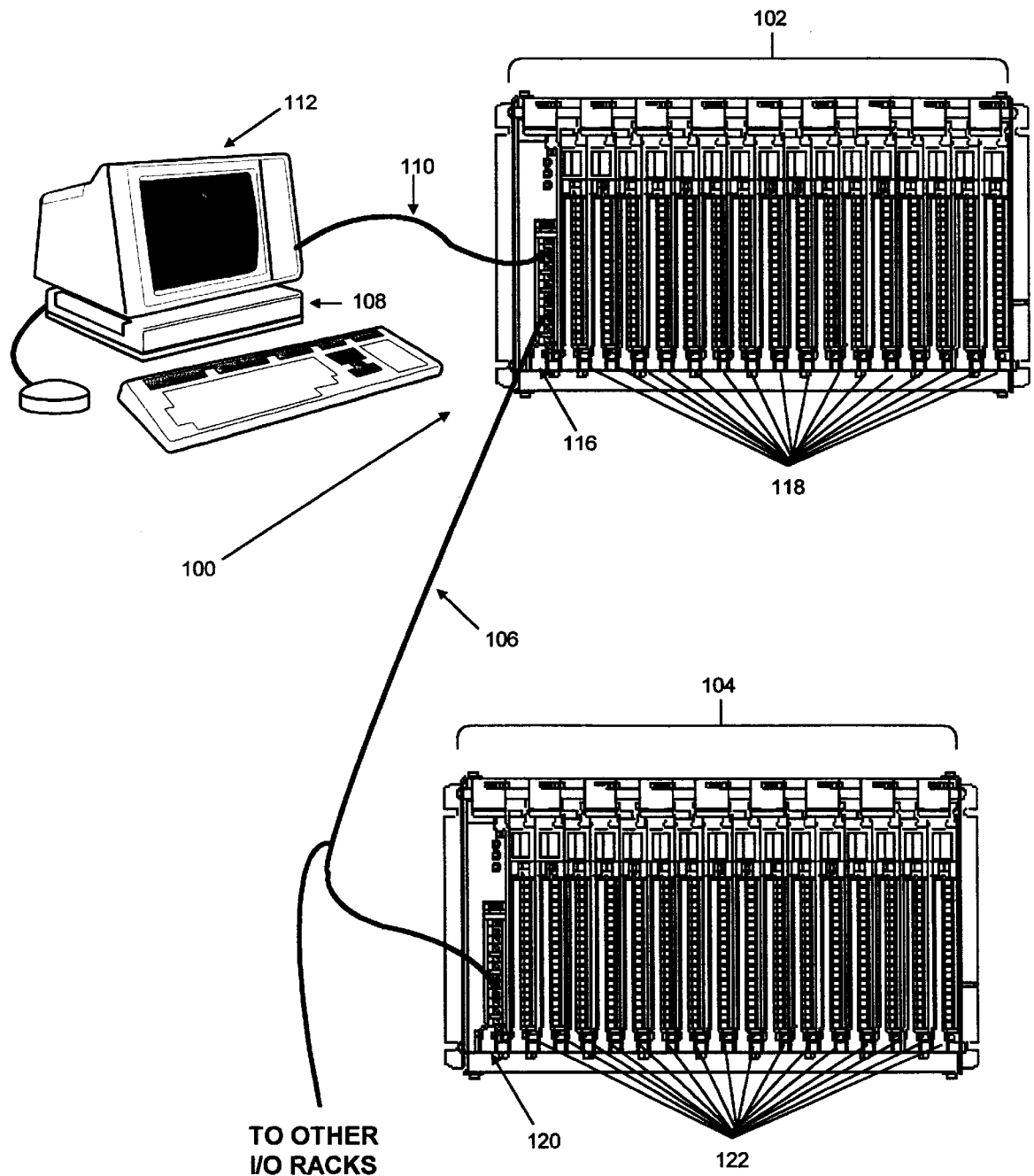
FIG. 1 shows a generic control system according to a preferred embodiment of the invention.

FIG. 1 shows a generic control system 100 according to the preferred embodiment of the apparatus of the invention. The generic control system 100 comprises a primary equipment rack 102 and a series of remote input/output (I/O) racks, such as rack 104, connected by a serial I/O network 106. A well-known programming terminal 108 includes a data storage device for storing a set of program instructions is connected to primary equipment rack 102 through a direct connection or through a well-known network means, such as a cable 110.

Programming terminal 108 preferably comprises a microprocessor in a Windows®-based environment, such as an IBM-compatible personal computer with a Intel® 486 microprocessor and at least twenty megabytes of disk storage space. Preferably, the programming terminal 108 includes WINVIEW® software. However, it should be appreciated that the invention is not limited by a computer system using a MS-DOS operating system, and that the invention can be practiced with any type of operating system, such as a UNIX-based operating system. In addition, the programming terminal 108 is loaded with the PLC-5 Programming Software (6200 Series or AI Series) from Allen-Bradley Company, Inc. Programming terminal 108 is sometimes referred to as a man-machine interface (MMI) or human-machine interface (HMI). To provide visual output to the user, a monitor 112 is preferably connected to programming terminal 108 and is equipped with a well-known graphics controller. The input devices for the programming terminal 108 usually include a mouse and a keyboard. Typically, the mouse includes two buttons, a right hand button (RHB) and a left hand button (LHB).

Primary equipment rack or programmable logic controller (PLC) 102, such as the PLC-5 manufactured by Allen-Bradley Company, includes a power supply (not shown), a processor module 116 and a plurality of I/O interface modules 118. Serial I/O network 106 is coupled to a second connector on the front panel of the processor module 116 and to an adaptor module 120 in the remote I/O rack 104, enabling the processor module 116 to exchange data with another group of I/O modules 122 within the remote I/O rack 104. Input modules inserted into the slots of PLC 102 and remote I/O rack 104 connect the PLC 102 to input devices (not shown), enabling PLC 102 to receive both digital and analog signals. Output modules coupled to PLC 102 connect PLC 102 to machines or other devices, enabling PLC 102 to transmit either digital or analog signals to control the machines (not shown).

It will be appreciated by those skilled in the art that PLC 102 can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The PLC 102 can also be implemented as a single special purpose integrated circuit (e.g., ASIC) having a main or central processor section for overall, system-level control, and separate sections dedicated to performing various different specific computations, functions and other processes under control of the central processor section. In general, any device or assembly of devices on which a finite state machine capable of implementing the invention can be used as the PLC 102.

Figure 2:
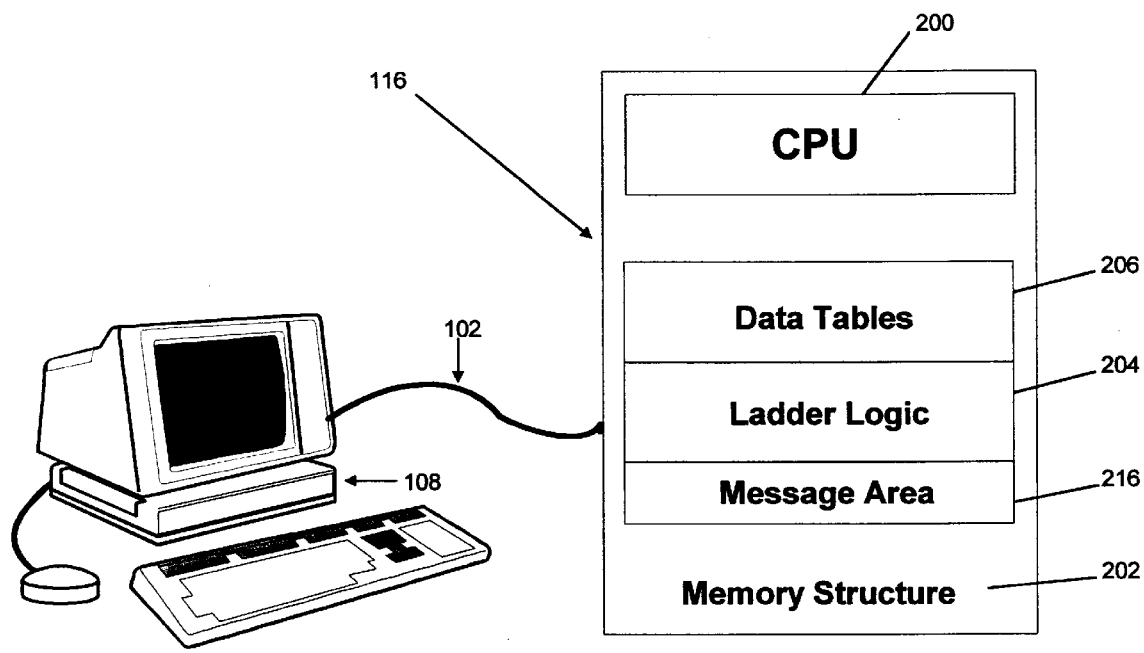
FIG. 2 shows a description of the programmable logic controller.

Referring now to FIG. 2, processor module 116 of PLC 102 includes a processor or CPU 200 and memory 202. A ladder logic program 204, for example, may be developed on programming terminal 108, downloaded and stored in the memory 202 of the PLC 102. Processor 200 then executes the ladder logic program 204 stored in memory 202. Memory 202 also stores output image tables, input image tables, timer storage, counter storage, and ladder logic program work space.

In an alternative embodiment, memory 202 may comprise an electronically erasable programmable read-only memory (EEPROM). The ladder logic program 204 can than then be downloaded into the EEPROM and electronically etched so that the PLC 102 can be booted from the ladder logic program 204. It should be understood that the invention is not limited by the type of memory device in which the ladder logic program 204 is stored in the PLC 102 and that the invention can be practiced with other types of memory devices, such as a random-access memory (RAM) device, and the like.

In most PLCs, such as those manufactured by the Allen-Bradley Company, memory is structured into Data Table files 206 comprising an Input Image, Output Image, Status, Bit, Timer, Counter, Control, Integer, and Floating Point files. As description of the various Data Table files can be found in U.S. Pat. No. 5,267,145, herein incorporated by reference.

In the preferred embodiment, PLC 102 uses addresses to refer to words and bits in the Data Table files. The addresses allow ladder logic program 204 to identify Data Table files, elements therein, and bits of the elements. Addresses are generally expressed as "<file type> <file number>:<element>.<subelement>/<bit number>." For example, address "B3:10/1" refers to "Bit file type; File #3; Element #10; Bit #1."

In most PLCs, addresses of elements in the Output Image and Input Image Data Table files are specified in octal format, i.e., 00–7 and 10–17 are valid bit addresses. All of the other file types use decimal addresses for elements. Bit type data files are "wordless." Addresses entered in a "word/bit" format are converted by the control program into a bit-only format. For example, if address B3:10/1 is entered by the user, the control program converts it to B3/161 (10 words×16 bits/word+1 bit).

Figure 3:
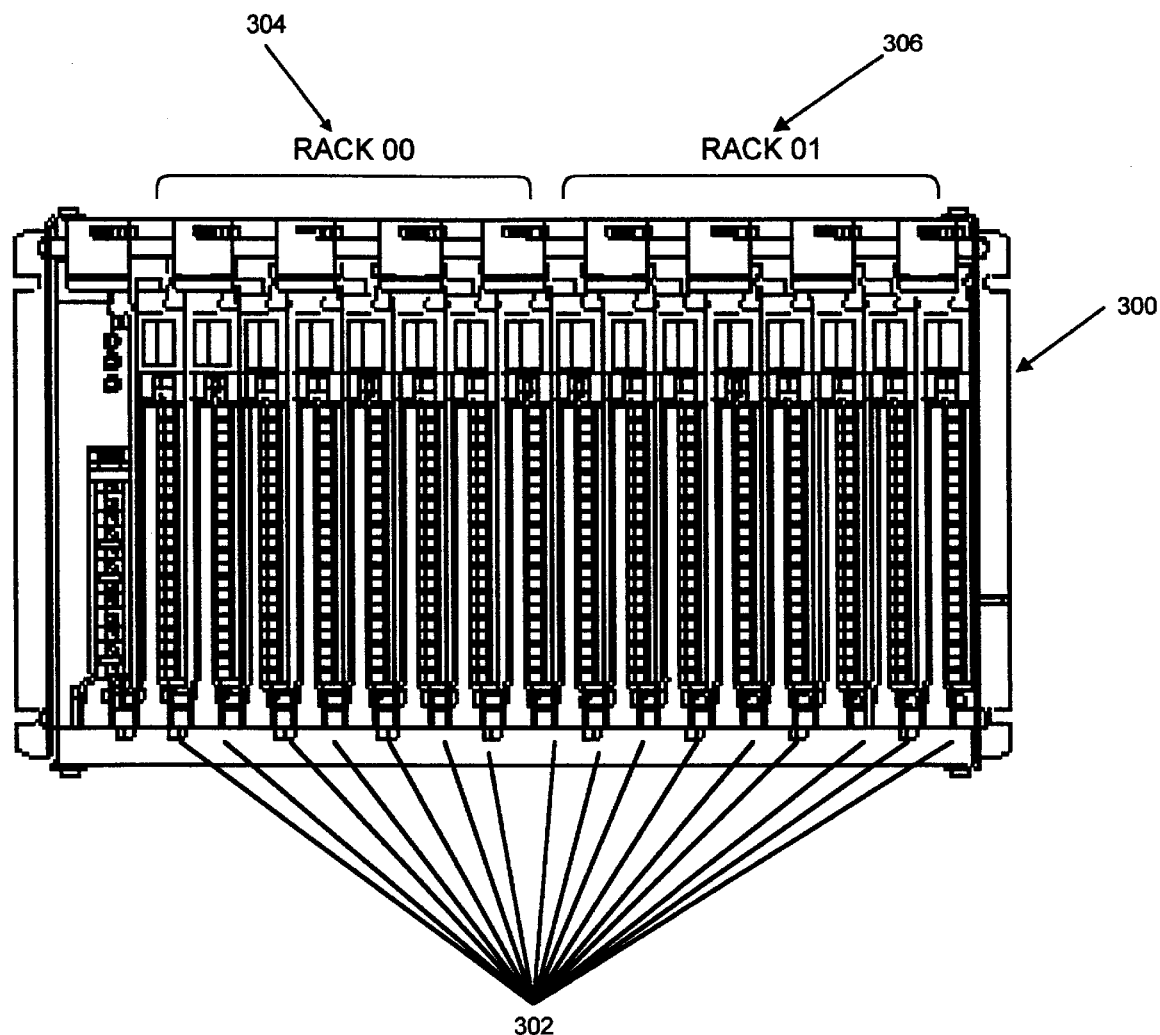
FIG. 3 shows the backplane of the programmable logic controller with two I/O Racks populated with various I/O modules.

FIG. 3 shows a typical Allen-Bradley I/O rack 300 and I/O backplane populated with various I/O interface modules 302. Each I/O interface module 302 occupies a slot in the I/O rack 300. The I/O rack 300 contains two I/O racks 304 and 306. The I/O rack 304 contains slots 000–007 and the I/O rack 306 contains slots 010–017. Each I/O rack 304, 306 has an addressing unit that corresponds to eight Input Image table words and eight Output Image table words. An I/O group is an addressing unit that corresponds to an Input Image table word (16 bits) and an Output Image table word (16 bits). An I/O group can contain up to sixteen inputs and sixteen outputs, and can occupy 2-slots, 1-slots, or ½ module slots for addressing purposes. An I/O rack contains eight (8) I/O groups. Depending on I/O chassis size and I/O group size, each I/O rack 304, 306 can occupy a fraction of an I/O chassis, a full I/O chassis, or multiple I/O chassis. In other words, the number of racks in a chassis depends on the chassis size and the addressing mode. For example, a chassis size with 8-slots and 2-slot addressing, the rack type is ½ rack type, with 1-slot addressing, the rack type is 1 rack and with ½ slot addressing, the rack type is 2 racks.

The general functions of processor 116 and I/O interface modules 118, 122 are well known in the art. Processor 116 executes the relay logic program or main control program 204, sometimes also referred to as a user's application program. The ladder logic program 204 is developed on the programming terminal 108 in a user program language, such as relay ladder logic, to create a control program for a specific industrial application. The ladder logic program 204 is then downloaded into the memory 202 of PLC 102. The relay ladder logic language uses a well-known set of program instructions. These instructions perform operations that are identified by mnemonics, such as XIC, XIO, BST, BND, GET, PUT and TON 0.1. A more complete description of control program instructions is described in U.S. Pat. No. 3,942,158, herein incorporated by reference.

Figure 4:
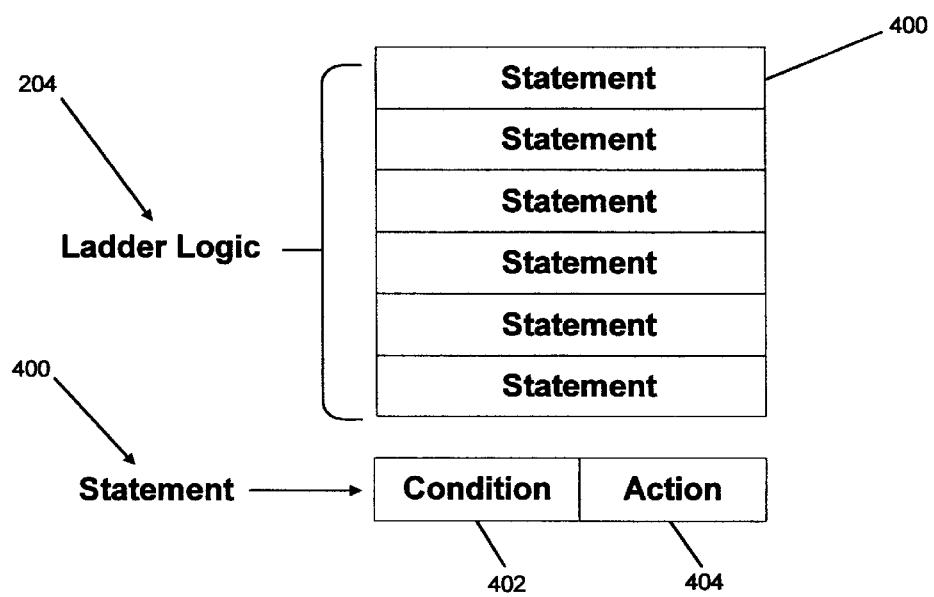
FIG. 4 shows the structure of a ladder logic program in the programmable logic controller.

Referring now to FIG. 4, relay ladder logic program 204 scanned by processor 116 of PLC 102 is a group of statements 400 often displayed to the programmer or field engineer in a graphical manner comprising ladder diagrams and functional block instructions. Each statement 400 or "rung" of the ladder logic program 204 comprises at least one condition test 402 and at least one action 404 to be performed when the condition 402 is met. When the condition 402 is met, the rung is "true" and some action is taken, such as, a signal is transmitted, a counter is enabled, a timer is started, and the like.

In executing the ladder logic program 204, processor 116 generates output status data in response to the state of input status data and according to the relay ladder logic contained in the ladder logic program 204. At some predetermined interval, processor 116 executes an I/O scan in which input status data is read from those of the I/O interface modules 118, 122 that are input modules, and output status data is written to those of the I/O interface modules 118, 122 that are output modules.

Figure 5:
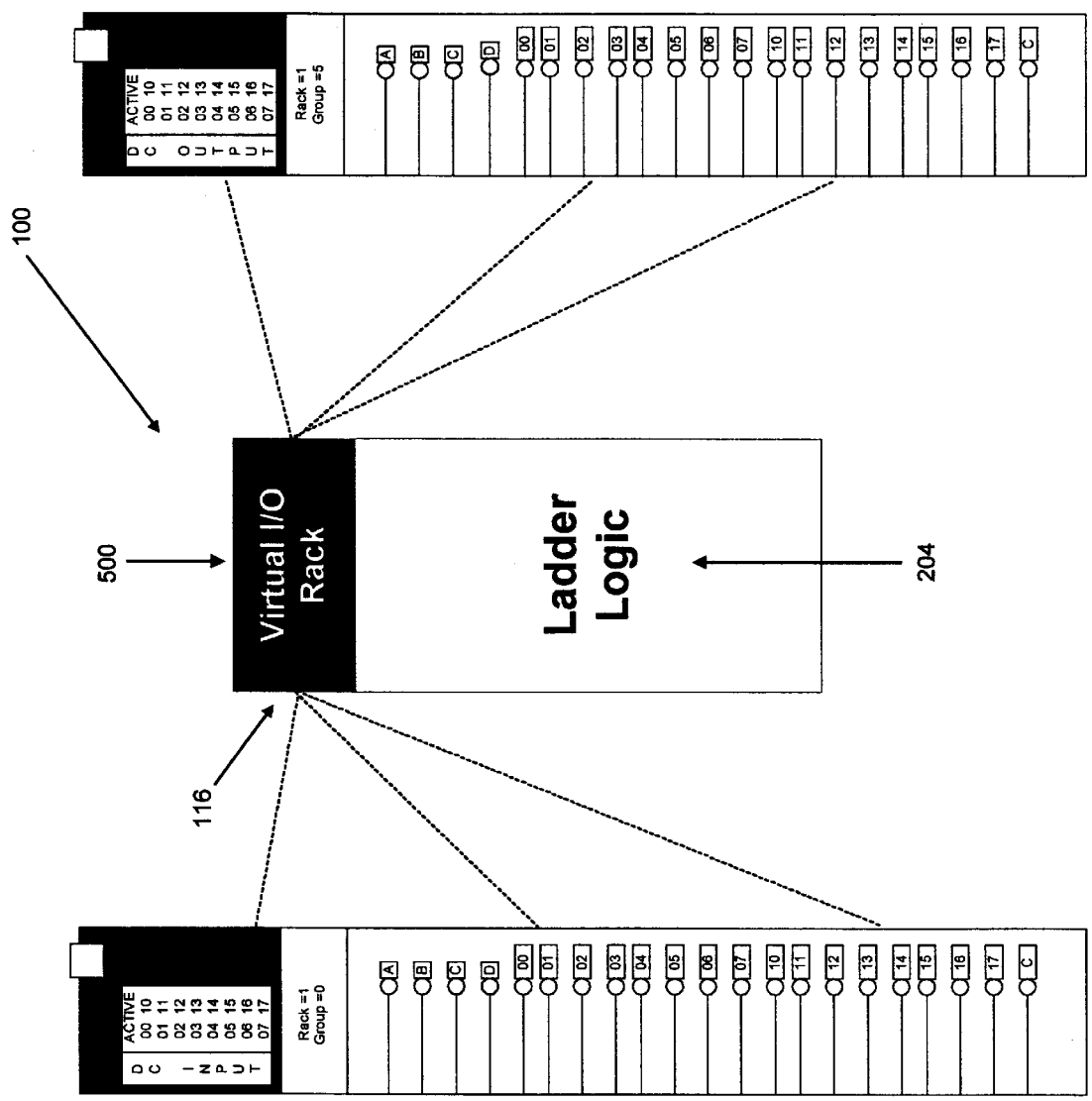
FIG. 5 shows a processor of the programmable logic controller in which a main control program and a Virtual Rack module has been downloaded.

Referring now to FIG. 5, the generic control system 100 also includes the Virtual Rack I/O module 500 that is also downloaded into the memory 202 of processor 116. In the preferred embodiment, both the ladder logic or main control program 204 and the Virtual Rack module 500 are written using the relay ladder logic programming language. However, it should be understood that ladder logic program 204 and the Virtual Rack module 500 can be written in any available programming language capable of being understood by processor 116 of PLC 102 and that the invention is not limited to the main control program 204 and the Virtual Rack module 500 being written using the relay ladder logic programming language.

In general, the Virtual Rack module 500 is a special purpose subroutine that is "called" from a "rung" of the ladder logic or main control program 204. When called by main control program 204, the Virtual Rack module 500 can configure the generic control system 100 at runtime to create a control program for a specific industrial application.

In the alternative embodiment, the ladder logic program 204 together with the Virtual Rack module 500 may be electrically etched (or "burned" into) on an EEPROM of processor 116. Once etched on the EEPROM, the PLC 102 may then be booted from the EEPROM containing the main control program 204 and the Virtual Rack module 500.

Once inserted into the main control program 204, the Virtual Rack I/O module 500 creates an underlying basic input/output operating system (BIOS) for the PLC 102. As described below, the programmer only needs to program the logic of the control algorithms and does not need to program where the various I/O devices will be located or when the various I/O devices were installed in the generic control system 100. In other words, the Virtual Rack module 500 resembles a configuration language, rather than a process control program. Once installed, the Virtual Rack module 500 does not require programming to create an application-specific control system, it only requires configuration of the generic control system 100.

Figure 6:
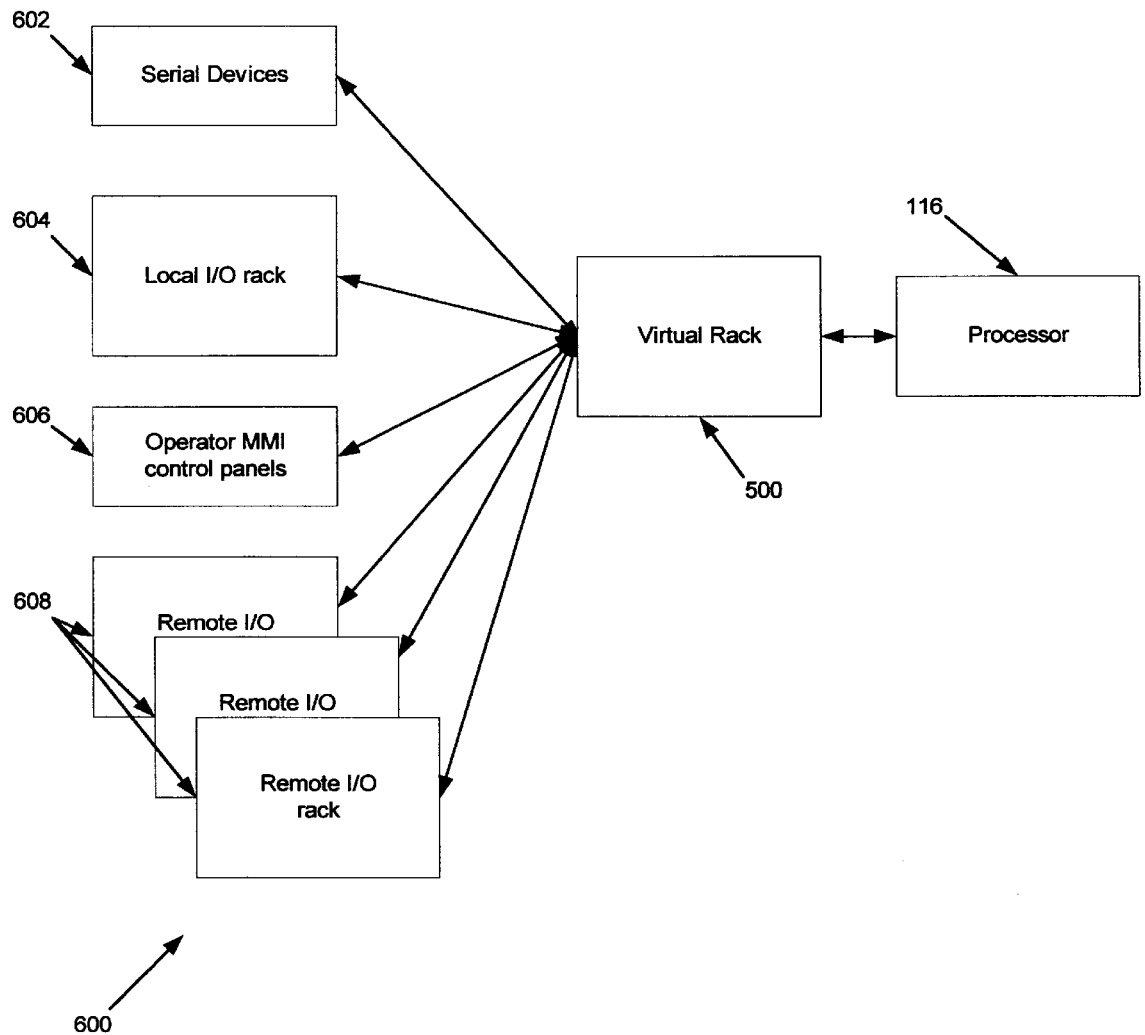
FIG. 6 shows the relationship between the programmable logic controller, the Virtual Rack module and various I/O devices.

As seen in FIG. 6, one advantage of the Virtual Rack module 500 acting as a BIOS is that it can communicate with various I/O module types 600, in addition to processor 116. The I/O module types 600 may include serial devices 602, a local I/O rack 604, an operator man-machine interface (MMI) or human-machine interface (HMI) control panel 606 and several remote I/O racks 608.

Because the Virtual Rack module 500 acts as a BIOS, the Virtual Rack module 500 assumes that an I/O module type 600 is a "number" that the processor 116 can send or receive on any I/O channel. Not only are the rack I/O hardware channels supported by the Virtual Rack I/O module 500, but RS-232 devices, Barcode devices, and fields on a MMI are also available channels for the Virtual Rack I/O module 500. Because the Virtual Rack module 500 enables the main control program 204 to become independent from the hardware, the generic control system 100 can be installed as a replacement or upgrade to an existing control system without wiring modifications.

One advantage of using the Virtual Rack module 500 is that the programmer or field engineer can assign what I/O module types 600 are installed and the location of the I/O module types 600 after all the hardware has been installed in the generic control system 100. In other words, the Virtual Rack module 500 allows the programmer to make software-to-hardware connections at runtime, rather than during programming of the main control program 204 for the PLC 102. Once the programmer has configured the Virtual Rack module 500, the programmer can then go to more configuration screens to configure the control algorithms, for example, to configure a closed loop or an open loop fluid control for a paint robotic system.

Figure 7A:
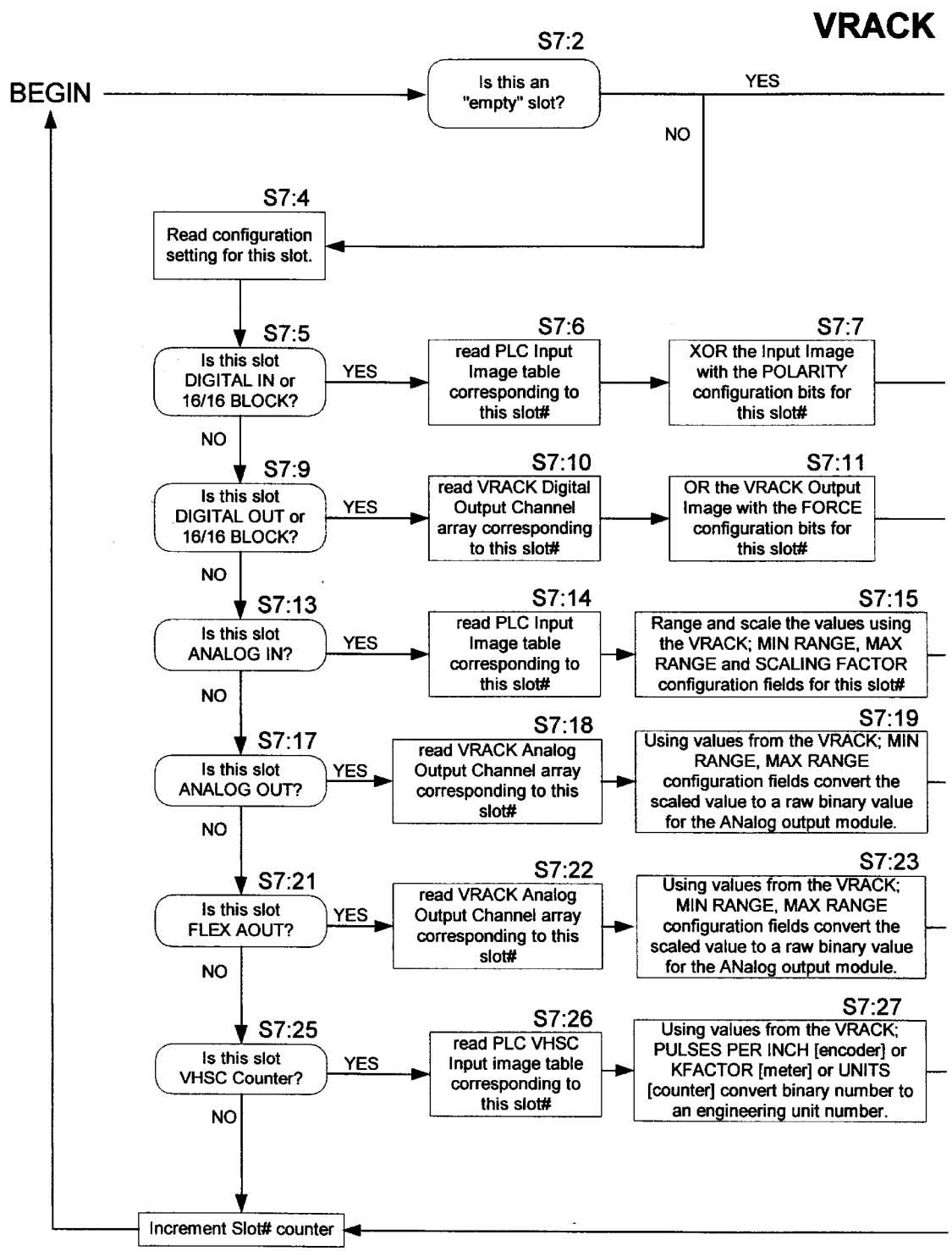
FIGS. 7A and 7B show a flowchart of the Virtual Rack routine, VRACK, according to a preferred embodiment of the invention.
Figure 7B:
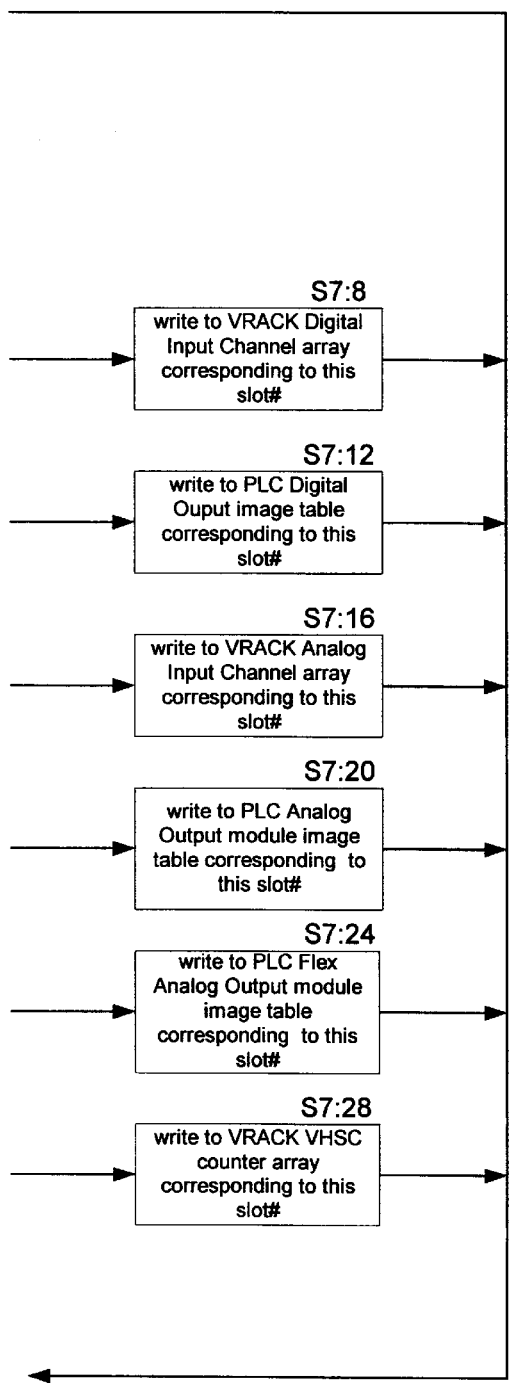

FIG. 7 shows a flowchart of the Virtual Rack module routine or VRACK routine. In general, the VRACK routine configures or re-assigns data addresses for the Data Table files 206 of processor 116 to Virtual Rack data addresses to create virtual I/O data addressing for PLC 102. For an input module type, such as a digital or analog input device, the VRACK routine reads from the Input Image table and writes to the VRACK Input Channel array corresponding to the slot number for that module type. Conversely, for an output module type, such as a digital or analog output device, the VRACK routine writes to the Input Image table and reads from the VRACK Input Channel array corresponding to the slot number for that module type.

FIG. 8 shows the various I/O module types that can be configured at runtime by the Virtual Rack module 500. Currently, the I/O module types include DIGITAL IN (digital input), DIGITAL OUT (digital output), ANALOG IN (analog input), ANALOG OUT (analog output), FLEX AOUT ("flex" analog output), 16/16 BLOCK and VHSC (very high speed counter).

The DIGITAL IN and DIGITAL OUT module types have a total of 16 channels per slot, a total of 277 (octal) or 192 (decimal) slots supported and a total of 3072 Virtual I/O channels. The ANALOG IN module type has a total of 8 channels per slot, a total of 170 (octal) slots or 120 (decimal) supported and a total of 960 Virtual I/O channels. The ANALOG OUT and FLEX AOUT module types have a total of 4 channels per slot, a total of 277 (octal) or 192 (decimal) slots supported and a total of 960 Virtual I/O channels. The 16/16 BLOCK module type has a total of 32 channels per slot, a total of 277 slots (octal) or 192 (decimal) supported and a total of 6144 Virtual I/O channels. The VHSC module type has a total of 4 channels per slot, a total of 30 slots (octal) or 24 (decimal) supported and a total of 96 Virtual I/O channels.

It should be understood that the invention is not limited by the module types and specifications listed above and that the invention can be practiced with other module types by simply adding that module type to the VRACK routine similar to the various I/O module types listed above.

The Virtual Rack module routine or VRACK routine begins at Step S7.1. Next, the routine determines if the programmer is configuring an empty slot number (without an input or output module type) in Step S7.2. If so, then the VRACK routine proceeds to Step S7.3, increments the slot number counter and then proceeds to Step S7.1 to begin the next loop of the VRACK routine. If in Step S7.2 the VRACK routine determines that the programmer is not configuring an empty slot number, then the routine reads the configuration setting for that slot number in Step S7.4.

Next, the VRACK routine determines in Step S7.5 whether the module type for that slot number is a DIGITAL IN or a 16/16 BLOCK module type. If so, then the routine reads the PLC Input Image Table corresponding to that slot number in Step S7.6. Then, the routine XORs the Input Image Table with the POLARITY configuration bits for that slot number in Step S7.7. Then, the routine writes to the VRACK Analog Input Channel array corresponding that slot number in Step S7.8. Then, the routine proceeds to Step S7.3, increments the counter for the slot number and then proceeds to Step S7.1 to begin the next iteration of the VRACK routine.

If in Step S7.5 the VRACK routine determines that the module type for that slot number is not a DIGITAL IN or a 16/16 BLOCK module type, then the routine proceeds to Step S7.9. In Step S7.9, the VRACK routine determines if the module type for that slot number is a DIGITAL OUT or a 16/16 BLOCK module type. If so, then the routine reads the VRACK Digital Output Channel array corresponding to that slot number in Step S7.10. Then, the routine ORs the VRACK Output Image with the FORCE configuration bits for that slot number in Step S7.11. Then, the VRACK routine writes to the PLC Output Image table corresponding to that slot number in Step S7.12. Then, the routine proceeds to Step S7.3, increments the counter for the slot number and then proceeds to Step S7.1 to begin the next iteration of the VRACK routine.

If in Step S7.9 the VRACK routine determines that the module type for that slot number is not a DIGITAL OUT or a 16/16 BLOCK module type, then the routine proceeds to Step S7.13. In Step S7.13, the VRACK routine determines if the module type for that slot number is a ANALOG IN module type. If so, then the routine reads the PLC Input Image Table corresponding to that slot number in Step S7.14. Then, the VRACK routine ranges and scales the values using the MIN RANGE, MAX RANGE and SCALING FACTOR configuration field for that slot number in Step S7.15. Then, the routine writes to the VRACK Analog Input Channel array corresponding that slot number in Step S7.16. Then, the routine proceeds to Step S7.3, increments the counter for the slot number and then proceeds to Step S7.1 to begin the next iteration of the VRACK routine.

If in Step S7.13 the VRACK routine determines that the module type for that slot number is not an ANALOG IN module type, then the routine proceeds to Step S7.17. In Step S7.17, the VRACK routine determines if the module type for that slot number is a ANALOG OUT module type. If so, then the routine reads the VRACK Analog Output Channel array corresponding to that slot number in Step S7.18. Then, the routine using the values from the VRACK MIN RANGE and MAX RANGE configuration fields to convert the scaled value to a raw binary value for that slot number in Step S7.19. Then, the VRACK routine writes to the PLC Analog Output module image table corresponding to that slot number in Step S7.20. Then, the routine proceeds to Step S7.3, increments the counter for the slot number and then proceeds to Step S7.1 to begin the next iteration of the VRACK routine.

If in Step S7.17 the VRACK routine determines that the module type for that slot number is not a ANALOG OUT module type, then the routine proceeds to Step S7.21. In Step S7.21, the VRACK routine determines if the module type for that slot number is a FLEX AOUT module type. If so, then the routine reads the VRACK Analog Output Channel array corresponding to that slot number in Step S7.22. Then, the routine using the values from the VRACK MIN RANGE and MAX RANGE configuration fields to convert the scaled value to a raw binary value for that slot number in Step S7.23. Then, the VRACK routine writes to the PLC Flex Analog Output module image table corresponding to that slot number in Step S7.24. Then, the routine proceeds to Step S7.3, increments the counter for the slot number and then proceeds to Step S7.1 to begin the next iteration of the VRACK routine.

If in Step S7.21 the VRACK routine determines that the module type for that slot number is not a FLEX AOUT module type, then the routine proceeds to Step S7.25. In Step S7.25, the VRACK routine determines if the module type for that slot number is a VHSC counter module type. If so, then the routine reads the PLC Input Image Table corresponding to that slot number in Step S7.26. Then, the VRACK routine uses the values from the VRACK PULSES PER INCH [encoder] or KFACTOR [meter] or UNITS [counter] to convert the binary number to an engineering unit number for that slot number in Step S7.27. Then, the routine writes to the VRACK VHSC counter array corresponding to that slot number in Step S7.28. Then, the routine proceeds to Step S7.3, increments the counter for the slot number and then proceeds to Step S7.1 to begin the next iteration of the VRACK routine.

The Virtual Rack module 500 also includes user-friendly configuration screens that allow the programmer to easily configure the various module types at runtime, rather than at installation as in conventional PLC control programs.

Figure 9A:
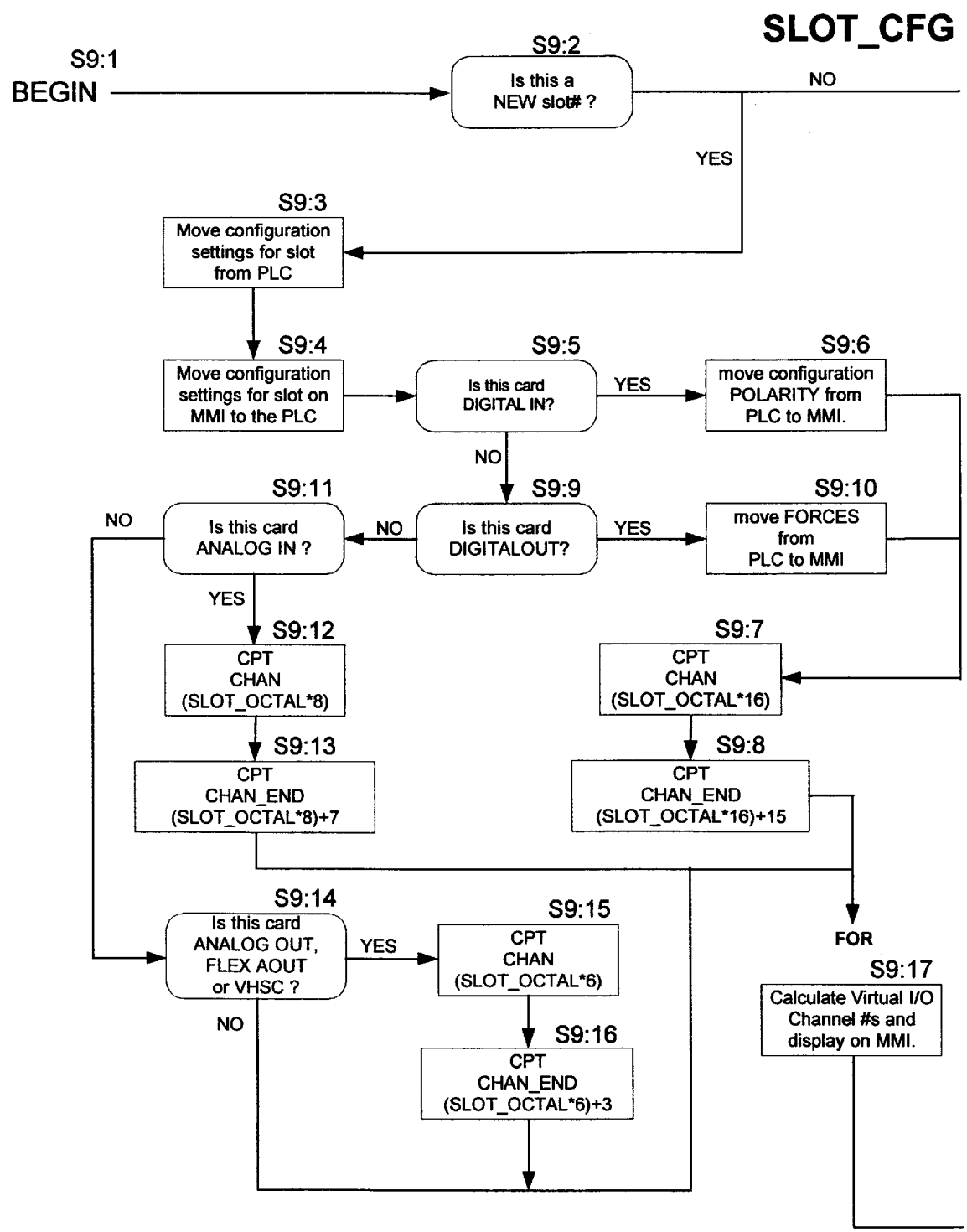
FIGS. 9A and 9B show a flowchart of the slot configuration routine, SLOT_CFG, according to a preferred embodiment of the invention.
Figure 9B:
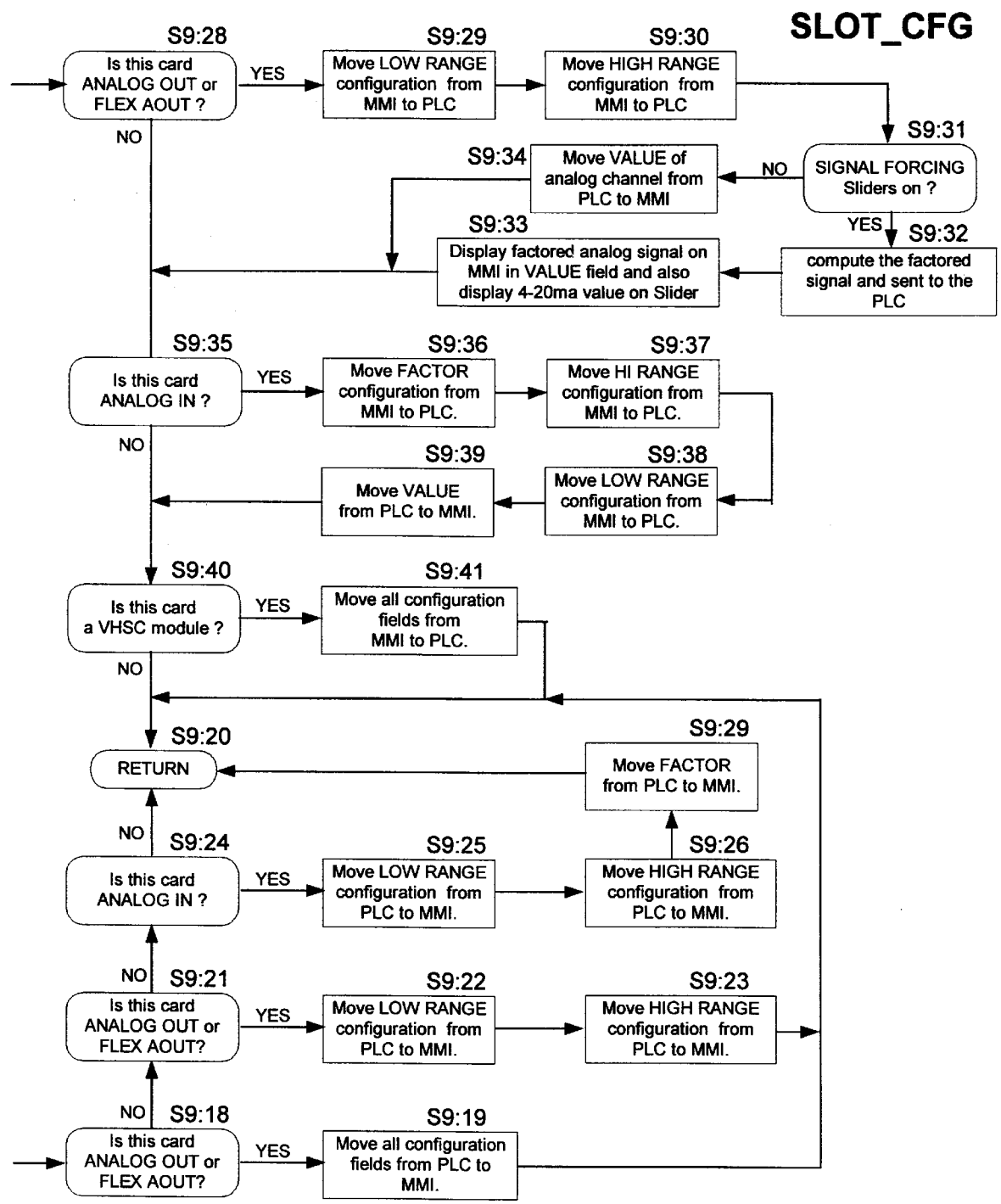

FIG. 9 shows a flowchart of the Virtual Rack module slot configuration routine or the SLOT_CFG routine. The SLOT_CFG routine provides a user-friendly interface between the MMI 108 and the PLC 116 for configuring the generic control system 100. The SLOT_CFG routine allows the programmer or field engineer to configure the application-specific control system at runtime by allowing the programmer to designate the location of various I/O module types 600.

The SLOT_CFG routine begins at Step S9.1 and determines if the programmer is configuring a new slot with new slot numbers in Step S9.2. If so, then the routine proceeds to Step S9.3 and moves the configuration setting for the slot of the PLC 102. Next, the routine moves the configuration setting for the slot on the MMI or HMI 108 to the PLC 102 at Step S9.4. Next, the routine determines if the new card is a DIGITAL IN module type in Step S9.5. If so, the routine moves the configuration POLARITY from the PLC 102 to the MMI 108 in Step S9.6. Then, the routine proceeds to Steps S9.7 and S9.8 and determines the beginning and ending slot numbers, respectively, for the DIGITAL IN module type.

If in Step S9.5 the routine determines that the card is not a DIGITAL IN module type, then the routine determines if the card is a DIGITAL OUT module type in Step S9.9. If so, then the routine proceeds to Step S9.10 and moves the configuration FORCES from the PLC 102 to the MMI 108. Then, the routine proceeds to Steps S9.7 and S9.8 and determines the beginning and ending slot numbers, respectively, for the DIGITAL OUT module type. Note that the routine automatically determines that the DIGITAL IN and DIGITAL OUT module types require 16 slot numbers. Then, the routine proceeds to Step S9.17 and calculates the Virtual Rack I/O channel numbers and displays the channel numbers on the MMI 108.

If in Step S9.9 the routine determines that the card is not a DIGITAL OUT module type, then the routine determines if the card is an ANALOG IN module type in Step S9.11. If so, then the routine proceeds to Steps S9.12 and S9.13 and determines the beginning and ending slot numbers, respectively, for the ANALOG IN module type. Note that the routine automatically determines that the ANALOG IN module type requires 8 slot numbers. Then, the routine proceeds to Step S9.17 and calculates the Virtual Rack I/O channel numbers and displays the channel numbers on the MMI 108.

If in Step S9.11 the routine determines that the card is not an ANALOG IN module type, then the routine determines if the card is an ANALOG OUT module type, a FLEX AOUT module type or a VHSC module type in Step S9.14. If so, then the routine proceeds to Steps S9.15 and S9.16 and determines the beginning and ending slot numbers for the ANALOG OUT, FLEX AOUT or VHSC module type, respectively. Note that the routine automatically determines that the ANALOG OUT, FLEX AOUT or VHSC module type requires 4 slot numbers and 2 additional configuration words for error designation (total 6 words). Then, the routine proceeds to Step S9.17 and calculates the Virtual Rack I/O channel numbers and displays the channel numbers on the MMI 108.

If in Step S9.14 the routine determines that the card is not an ANALOG OUT, FLEX AOUT or VHSC module type, then the routine proceeds to Step S9.17 and calculates the Virtual I/O channel numbers and displays the channels numbers on the MMI 108.

Next, the routine proceeds to Step S9.18 and determines whether the card is a VHSC module type. If so, then the routine move all configuration fields from the PLC 102 to the MMI 108 in Step S9.19 and RETURNS in Step S9.20.

If in Step S9.18 the routine determines that the card is not a VHSC module type, then the routine proceeds to Step S9.21 and determines whether the card is an ANALOG OUT or a FLEX AOUT module type. If so, then the routine moves the LOW RANGE configuration from the PLC 102 to the MMI 108 in Step S9.22. Next, the routine moves the HI RANGE configuration from the PLC 102 to the MMI 108 in Step S9.23 and RETURNS in Step S9.20.

If in Step S9.21 the routine determines that the card is not an ANALOG OUT or FLEX AOUT module type, then the routine proceeds to Step S9.24 and determines whether the card is an ANALOG IN module type. If so, then the routine moves the LOW RANGE configuration from the PLC 102 to the MMI 108 in Step S9.25. Next, the routine moves the HI RANGE configuration from the PLC 102 to the MMI 108 in Step S9.26. Then, the routine moves the FACTOR configuration from the PLC 102 to the MMI 108 in Step S9.27 and RETURNS in Step S9.20.

If in Step S9.2 the routine determines that a slot with new slot numbers is not being configured, then the routine determines whether the card is an ANALOG OUTPUT or FLEX AOUT module type in Step S9.28. If so, then the routine moves the LOW RANGE configuration from the MMI 108 to the PLC 102 in Step S9.29. Next, the routine moves the HI RANGE configuration from the MMI 108 to the PLC 102 in Step S9.30. Then, the routine determines whether the SIGNAL FORCING sliders are on in Step S9.31. If so, then the routine determines the factored signal to send to the PLC 102 in Step S9.32. Then, the routine displays the factored analog signal on the MMI 108 in the VALUE field and also displays the 4–20 ma value on the slider in Step S9.32. If in Step S9.31, the routines determines that the SIGNAL FORCING sliders are not on, then the routine moves the VALUE of the analog channel from the PLC 102 to the MMI 108 in Step S9.34.

Next, the routine determines whether the card is an ANALOG IN module type in Step S9.35. If so, then the routine moves the FACTOR configuration from the MMI 108 to the PLC 102 in Step S9.36. Next, the routine moves the HI RANGE configuration from the MMI 108 to the PLC 102 in Step S9.37. Then, the routine moves the LOW RANGE configuration from the MMI 108 to the PLC 102 in Step S9.38. Then, the routine moves the VALUE of the analog channel from the PLC 102 to the MMI 108 in Step S9.39.

Next, the routine determines whether the card is a VHSC module type. If so, then the routine moves all the configuration fields from the MMI 108 to the PLC 102 and RETURNS in Step S9.20. If not, then the routine RETURNS in Step S9.20.

Figure 10:
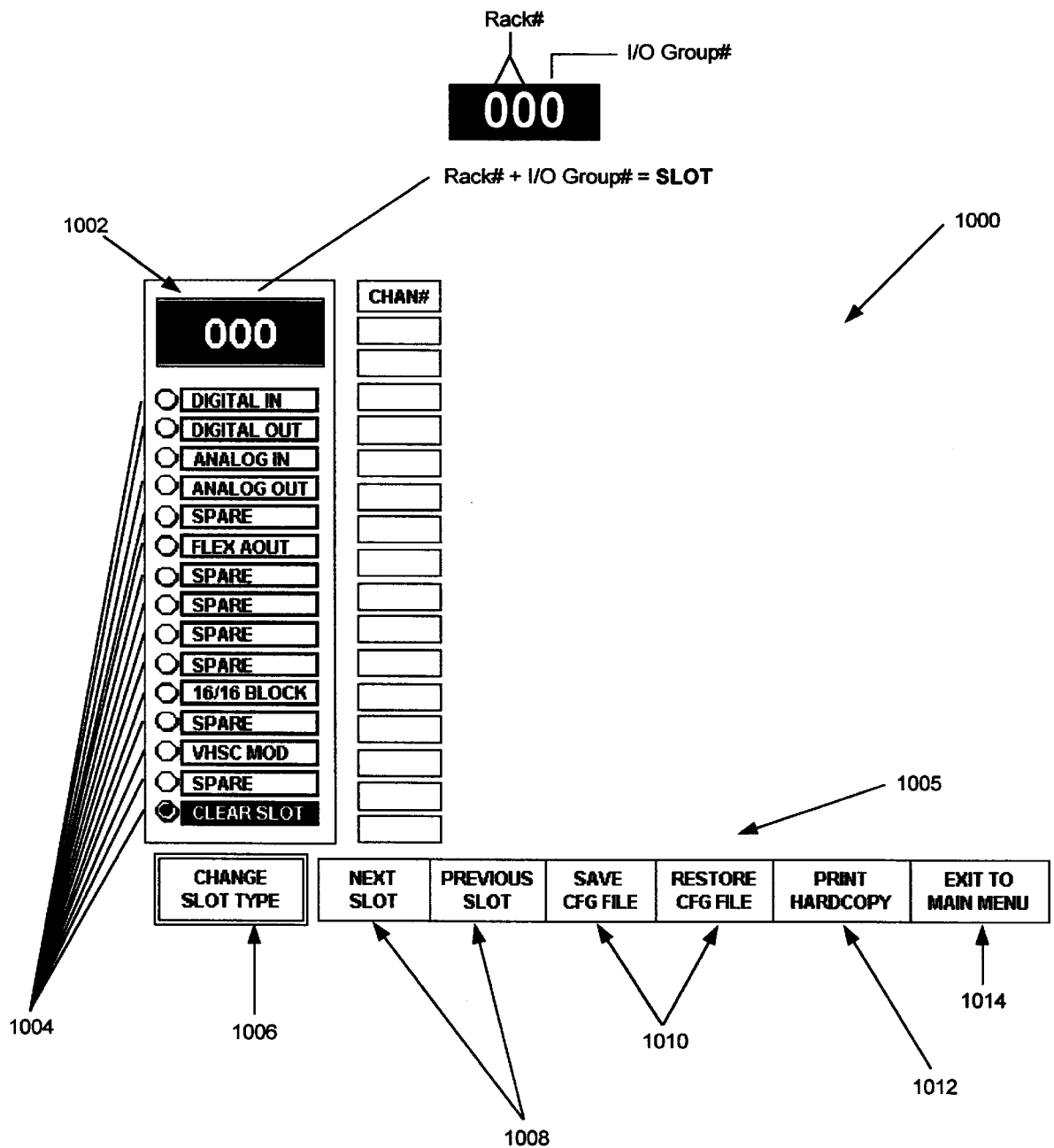
FIG. 10 shows a base configuration screen according to a preferred embodiment of the invention.

To configure a module type using the SLOT_CFG routine in accordance with the preferred method of the invention, the programmer displays a configuration screen 1000 on the MMI 108 as shown in FIG. 10. The configuration screen is used by the programmer for specifying the location and type of various I/O module types 600. One advantage of the Virtual Rack module 500 is that the programmer can configure the various I/O module types 600 at runtime, rather that at installation as in conventional control systems.

The available types of configuration screens available to the programmer using the Virtual Rack I/O module are: Digital [On/Off] Input, Digital Output, Analog Input, Analog Output, Flex Analog Output, 16/16 Digital I/O block, Very High Speed Counter module, Spare and Clear [empty]. However, it should be understood that the invention is not limited to the configuration screens for the module types listed above and that the invention can be practiced with a configuration screen for any I/O module type.

In general, each configuration screen 1000 of the Virtual Rack I/O module 500 includes a slot number display box 1002 indicating the slot number. The slot number indicated in the slot number display box represents an octal number indicating the I/O rack and the I/O Group number. The rack number is indicated by the first two digits of the slot number and the I/O Group number is indicated by the last digit. For example, slot number "005" (octal) indicates rack "00" and I/O group "5", and slot number "013" (8+3=11 decimal) indicates rack "01" and I/O group "3". As shown in FIG. 10, slot number "000" is indicated.

Each configuration screen 1000 also includes a plurality of I/O Module selectors 1004 comprising radio buttons corresponding to the various I/O module types (DIGITAL IN, DIGITAL OUT, . . . ). The I/O module type to be configured is selected by the programmer clicking on the radio button adjacent the I/O module type. The I/O module selection is indicated by the filled radio button. As seen in FIG. 10, I/O Module selector 1004 initially selected by the Virtual Rack module 500 is CLEAR SLOT. When CLEAR SLOT is activated, the programmer can clear all the values assigned by the programmer for that slot number. The configuration screen 1000 indicates a SPARE I/O Module selector. The SPARE I/O Module selector allows the programmer to program an additional I/O module type to configure using the Virtual Rack module 500.

Figure 30:
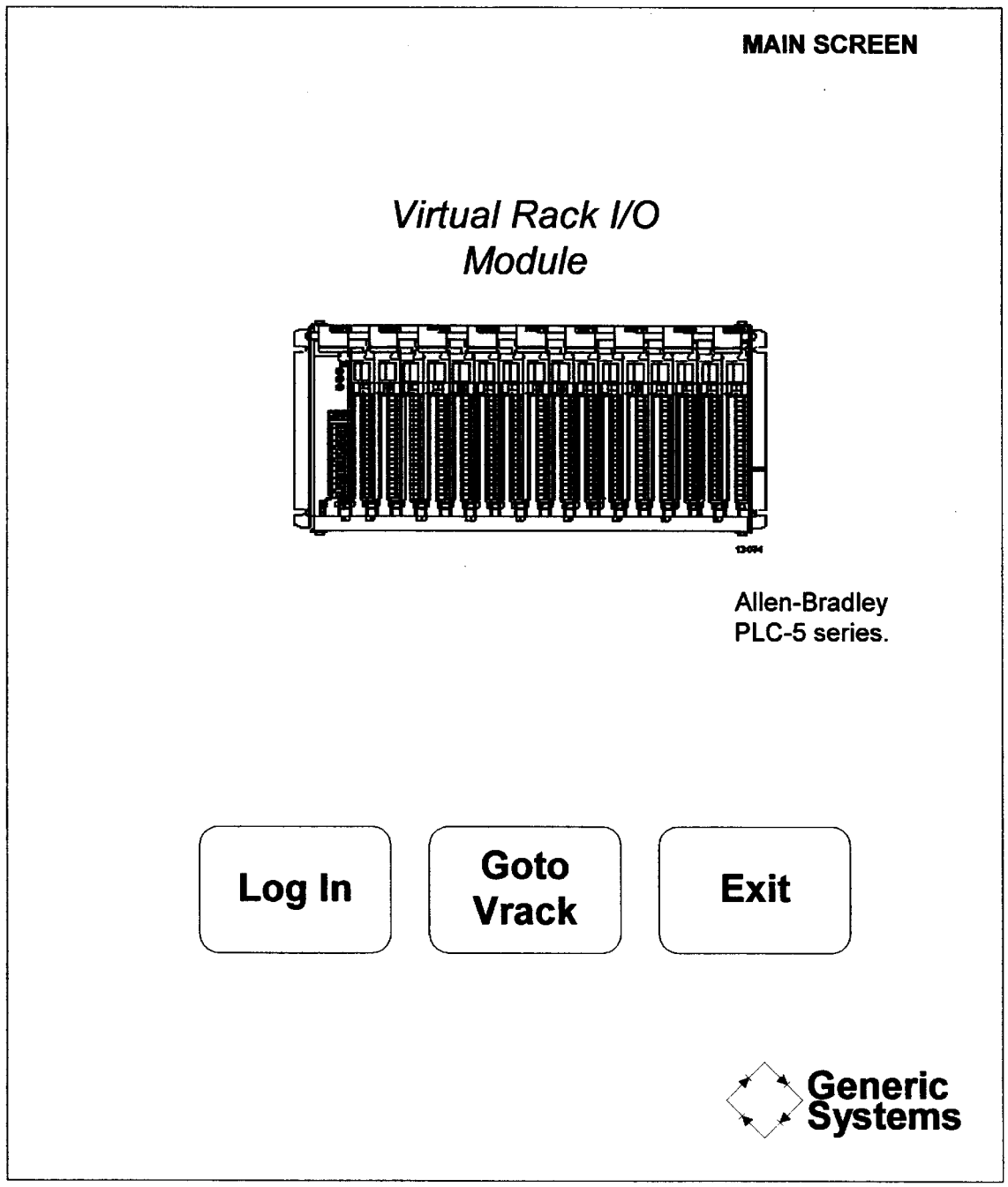
FIG. 30 shows a main menu screen for the Virtual Rack module.

Each configuration screen 1000 also includes several clickable buttons along a bottom portion 1005 of the configuration screen 1000. The buttons perform various functions when clicked or depressed by the programmer. For example, the "CHANGE SLOT TYPE" button 1006 allows the programmer to effectuate the changes in the I/O Module selection. When depressed, the "NEXT SLOT" and "PREVIOUS SLOT" buttons 1008 allow the programmer to navigate up or down through the I/O slots and select the slot to be configured. The "SAVE CFG FILE" and "RESTORE CFG FILE" buttons 1010 allow the programmer to "Save to" or "Restore" system configuration from the hard disk of the programming terminal 108 to the PLC 102. The "PRINT HARDCOPY" button 1012 allows the programmer to send a copy of the configuration screen 1000 to the printer (not shown). When depressed, the "EXIT TO MAIN MENU" button 1014 exits the configuration screen 1000 and proceeds to the Main Menu (FIG. 30).

Figure 11:
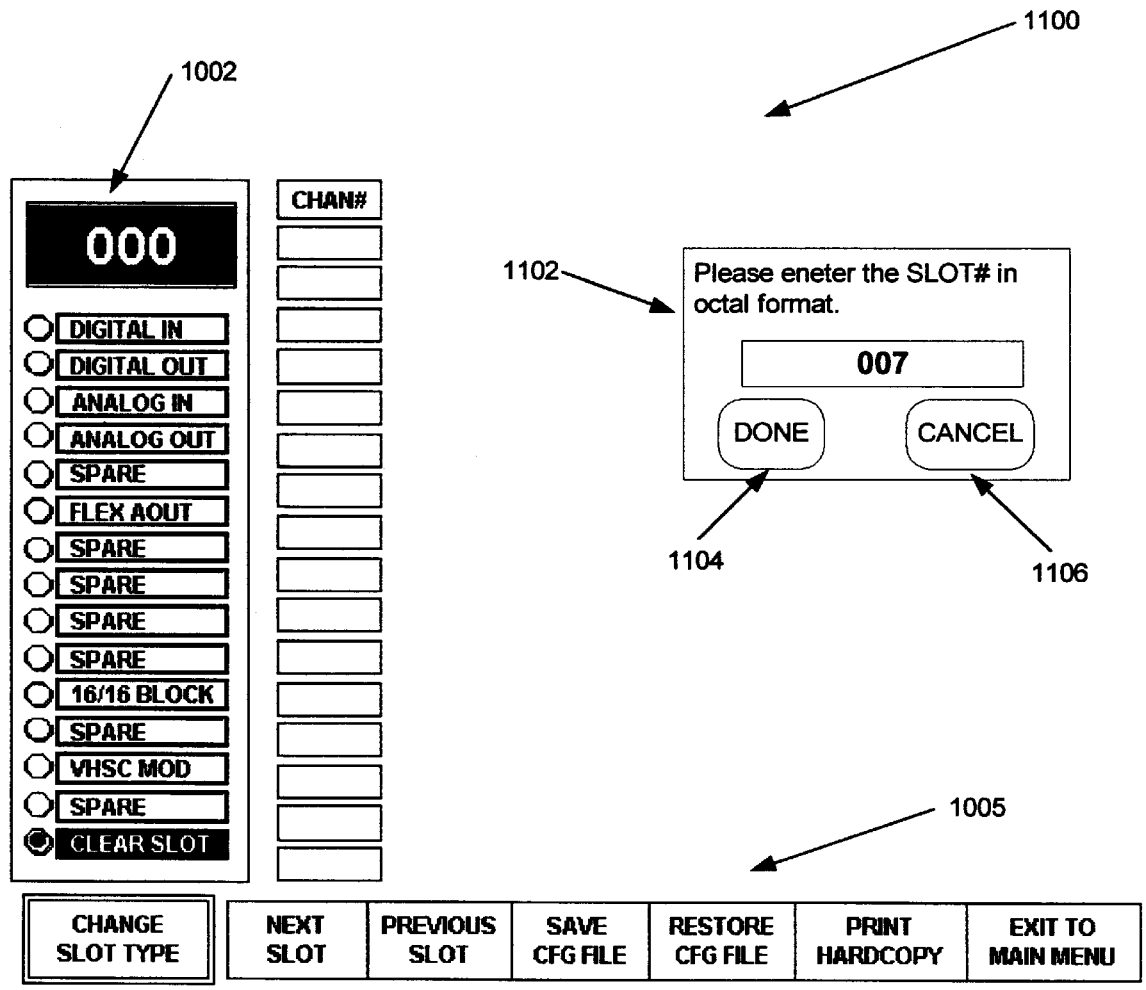
FIG. 11 shows a configuration screen with a dialog box for entering a slot number to be configured.

An alternative to clicking on the "NEXT SLOT" and "PREVIOUS SLOT" buttons 1008 to configure a particular slot, the programmer can select the slot by clicking on the slot number display box 1002 on configuration screen 1000 of FIG. 10. When the slot number display box 1002 is clicked, a dialog box 1102 pops up as shown on configuration screen 1100 in FIG. 11. The programmer can then enter slot number 007 directly in the dialog box 1102. As seen in FIG. 11, the programmer has entered slot number 007 in the dialog box 1102. Once the programmer has properly entered the slot number in the dialog box 1102, the programmer can then depress the "DONE" button 1104 on the dialog box 1102. To cancel an incorrectly entered slot number, the programmer can depress the "CANCEL" button 1106 on the dialog box 1102 and then enter the correct slot number as displayed in the dialog box 1102.

Figure 12:
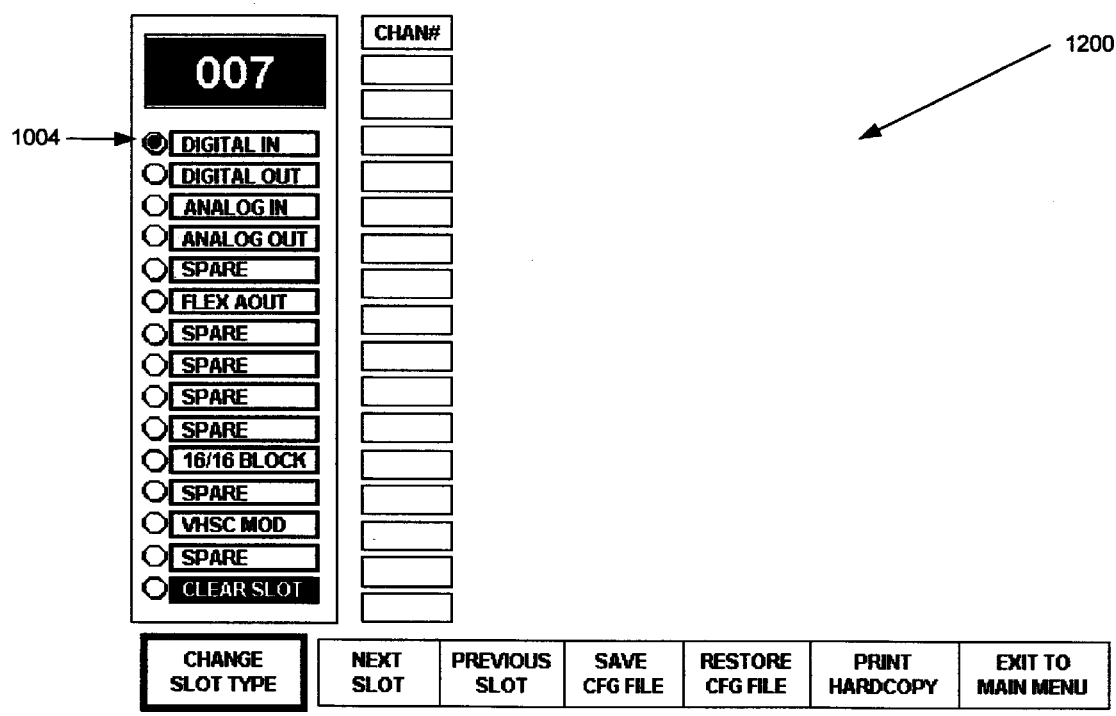
FIG. 12 shows a configuration screen for selecting an I/O module type to be configured.

Next, the programmer can select the I/O module type for the selected slot in the PLC 102, for example, slot number 007, by clicking on the appropriate I/O Module selector 1004 on configuration screen 1100 of FIG. 11. As seen in FIG. 12, the DIGITAL IN (digital input) module type, such as an Allen-Bradley® 1771-IBD 24 VDC Digital Input Module, has been selected by the programmer as indicated by the filled radio button on configuration screen 1200. Other Digital Input Modules compatible with the Virtual Rack I/O module 500 include the Allen-Bradley® 1771-IND, 1771-IAD/C, 1771-ID, 1771-IMD, 1771-IGD, 1771-ICD, 1771-IQ16, 1791-16BO, 1791-16AO and 1794-IB16. It should be appreciated that the invention is not limited by the Digital Input Modules listed above and that the invention can be practiced by any type of compatible Digital Input Module.

Figure 13:
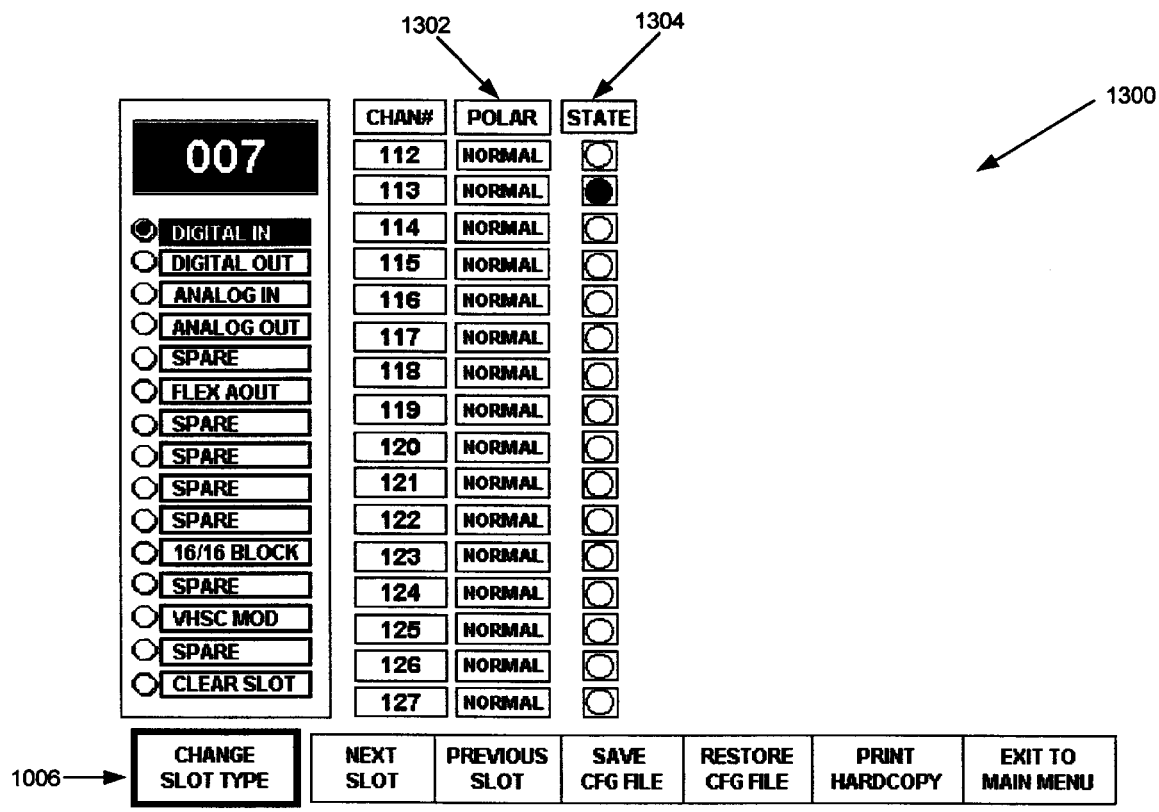
FIG. 13 shows a configuration screen for activating a selected I/O module type to be configured.
Figure 14:
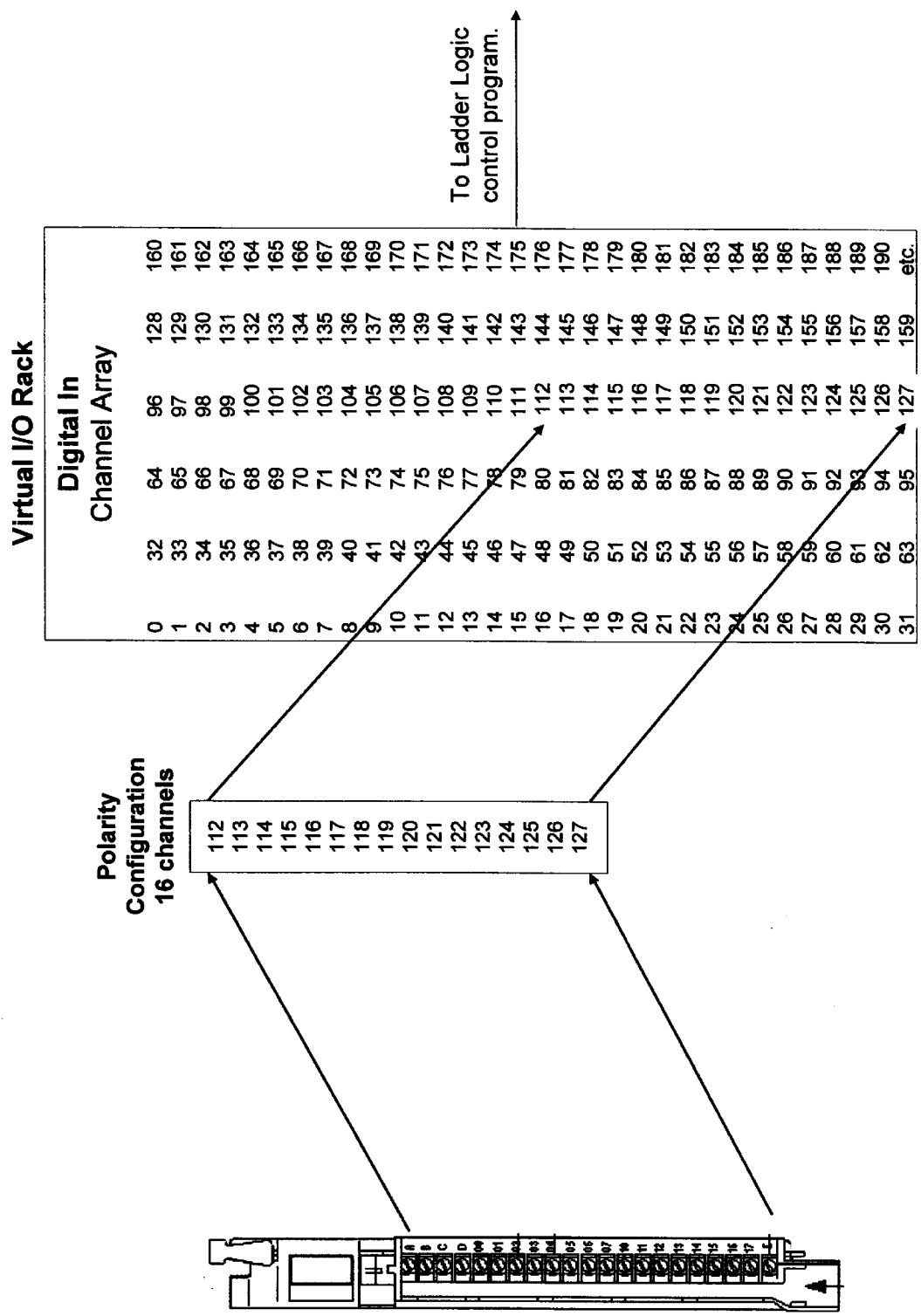
FIG. 14 shows the relationship between the slot number and the Virtual Rack channel numbers for a DIGITAL IN module type.

FIG. 13 shows the configuration screen 1300 for the DIGITAL IN module type. The configuration screen 1300 for the DIGITAL IN module type is activated when the programmer clicks on the "CHANGE SLOT TYPE" button 1006 located at the bottom portion 1005 of the configuration screen 1200 of FIG. 12. The I/O module selection is then activated for slot number 007 as indicated by the module type in bold type on configuration screen 1300. In addition, the appropriate configuration and display options or configuration fields for the selected DIGITAL IN module type will appear on the configuration screen 1300. Note that the Virtual Rack module 500 automatically determines that the DIGITAL IN module type located in slot number 007 will be associated with channel numbers 112–127 (7×16=112+15=127). In other words, the Virtual Rack module 500 assigns data addresses 112–127 of the total 3072 Virtual I/O channels (FIG. 8) to the DIGITAL IN module type located in slot number 007. These channel numbers are used by the ladder logic program 204 to reference the 16 contacts available for each slot of the DIGITAL IN module type as seen in FIG. 14.

Referring now to FIG. 13, the configuration field displayed by the Virtual Rack module 500 for the DIGITAL IN module type is the POLAR configuration field 1302. The POLAR configuration field 1302 indicates the polarity for each channel number. As seen in FIG. 13, the polarity for all the channel numbers 112–127 are indicated as "NORMAL". In addition, configuration screen 1300 indicates the actual STATE 1304 for each channel of the DIGITAL IN module type as indicated by a corresponding radio button. As seen in FIG. 13, the STATE 1304 of channel number 113 is indicated as "ON" and the STATE 1304 of remaining channel numbers (112, 114–127) are indicated as "OFF".

Figure 15:
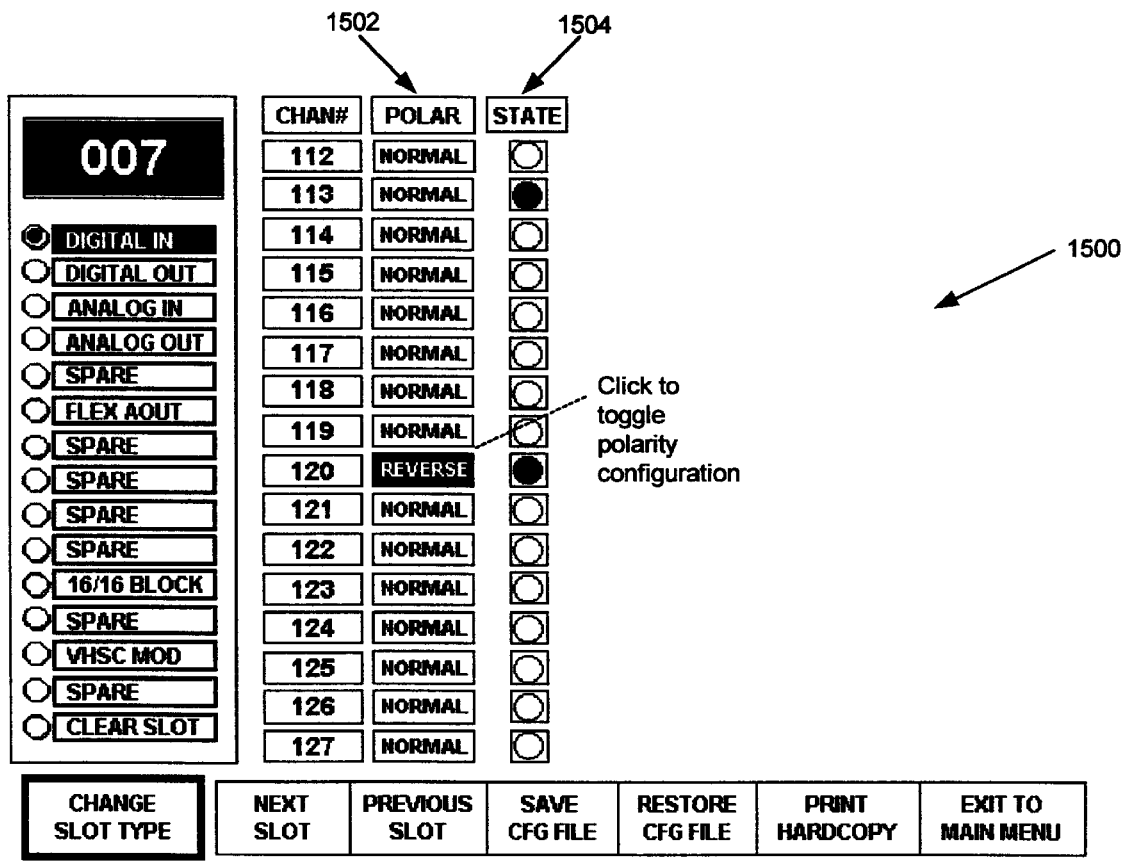
FIG. 15 shows a configuration screen for a DIGITAL IN module type according to a preferred embodiment of the invention.

The Virtual Rack module 500 allows the programmer to reverse the polarity of each channel of the DIGITAL IN module type. FIG. 15 shows a configuration screen 1500 in which the programmer has reversed the polarity of channel number 120 from "NORMAL" to "REVERSE" by clicking on the POLAR configuration field 1502 for that channel number. Note that the STATE 1504 of channel number 120 is indicated as "ON", even though the field device connected to that channel is really "OFF". Thus, when the field contact is energized, the Virtual Rack module 500 will report it as deenergized. On the other hand, when the field contact is deenergized, the Virtual Rack module 500 will indicate it as energized. In other words, reversed polarity means that the state of the input will be reversed in the Virtual Rack module 500.

The purpose of the POLAR configuration field 1502 is to allow the programmer to use only "true" or "on" state logic in the ladder logic program 204. For example, an application uses a variety of proximity switches that are inputs to the PLC that report when a part is in a certain position on an assembly line. The engineer uses a variety of types and manufacturers of proximity switches in designing the assembly line. Some of the switches are designed to turn "on" when a part is in front of them, while others work in the opposite manner and turn "off" when a part is in front of them. This is a common occurrence in a complex control system. Many digital switches installed in the system will work on opposite polarity. This can be a real problem for a programmer who must know the polarity of every switch. The POLAR configuration field 1502 solves this dilemma by allowing the programmer to ignore the polarity of contacts while writing the program assuming all devices are "true" or normal polarity, and then during installation, the programmer can use the polarity configuration field to reverse the polarity of any switch that uses "false" or "off" polarity to a "true" or "on" polarity for which the program has been written.

Figure 16:
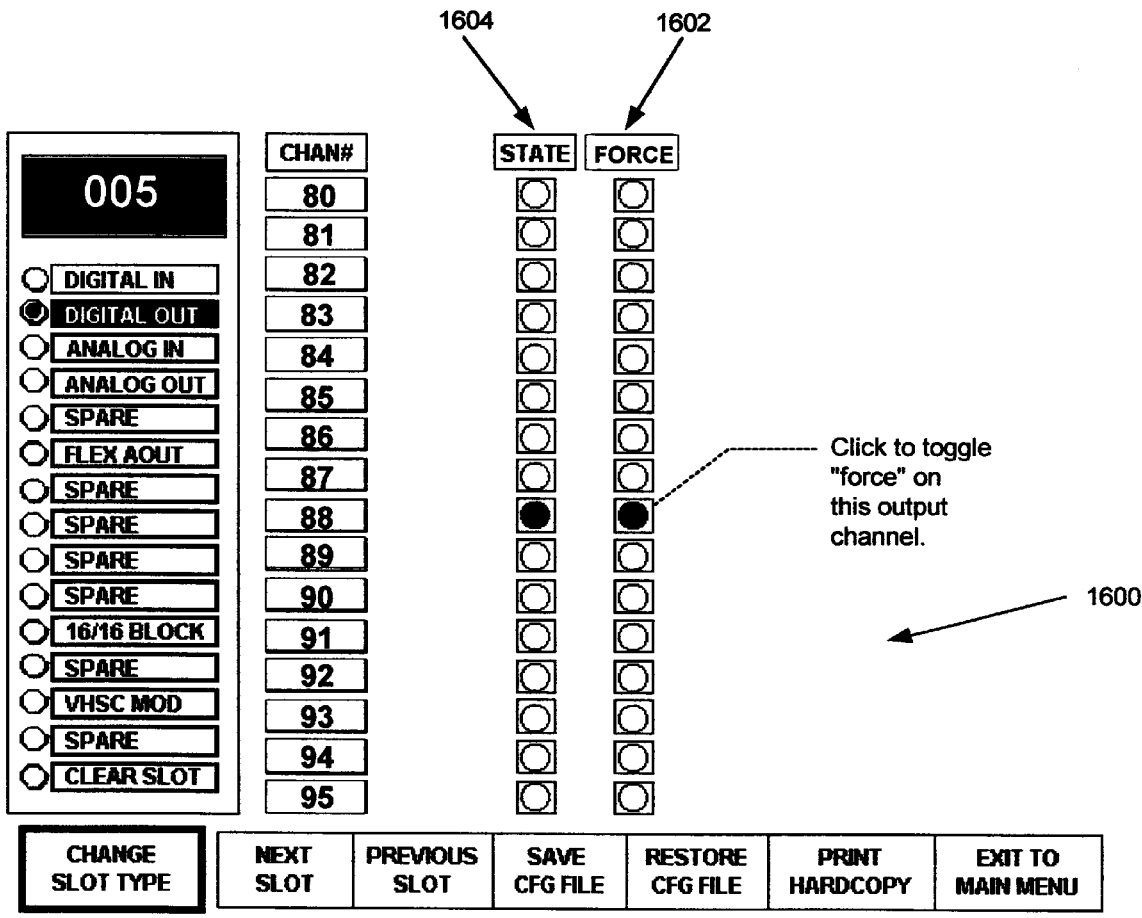
FIG. 16 shows a configuration screen for a DIGITAL OUT module type according to a preferred embodiment of the invention.

FIG. 16 shows the configuration screen 1600 for the DIGITAL OUT module type. The configuration screen 1600 for the DIGITAL OUT module type, such as an Allen-Bradley® 1771-OBD 24 VDC Digital Output Module, is activated when the programmer clicks on the "CHANGE SLOT TYPE" button 1006 located at the bottom portion 1005 of the configuration screen 1200 of FIG. 12. Other Digital Output Modules compatible with the Virtual Rack I/O module 500 include the Allen-Bradley® 1771-OND, 1771-ODD, 1771-OD16, 1771-OAD, 1771-OMD, 1771-OBDS, 1771-OQ16, 1791-OB16, 1791-OA16 and 1794-OB16. It should be appreciated that the invention is not limited by the Digital Output Modules listed above and that the invention can be practiced by any type of compatible Digital Output Module.

The I/O module selection is indicated as activated for slot number 005 by the DIGITAL OUT module type being displayed in bold type on configuration screen 1600. In addition, the appropriate configuration and display options or configuration fields for the selected DIGITAL OUT module type will appear on the configuration screen 1600. Note that the Virtual Rack module 500 automatically determines that the DIGITAL OUT module type located in slot number 005 will be associated with channel numbers 80–95 (5×16=80+15=95).

The configuration field displayed by the Virtual Rack module 500 for the DIGITAL OUT module type is the FORCE configuration field 1602. The FORCE configuration field 1602 is a utility that allows the programmer to force on outputs to test field wiring and equipment during the installation of the Virtual Rack module 500. For example, an indicating lamp is supposed to be wired to channel number 84. To test the field wiring and lamp, the programmer or installer enables a "FORCE" of that contact. If the lamp turns on, then no wiring problem or faulty lamp exists. On the other hand, if the lamp fails to turn on, then a wiring problem or faulty lamp exists.

In addition, the configuration screen 1600 for the DIGITAL OUT module type includes the STATE 1604 for each channel of the DIGITAL OUT module type. Note that the configuration screen indicates that the state of channel number 84 is "ON" and the state of the remaining channel numbers (80–83 and 85–95) are "OFF".

Figure 17:
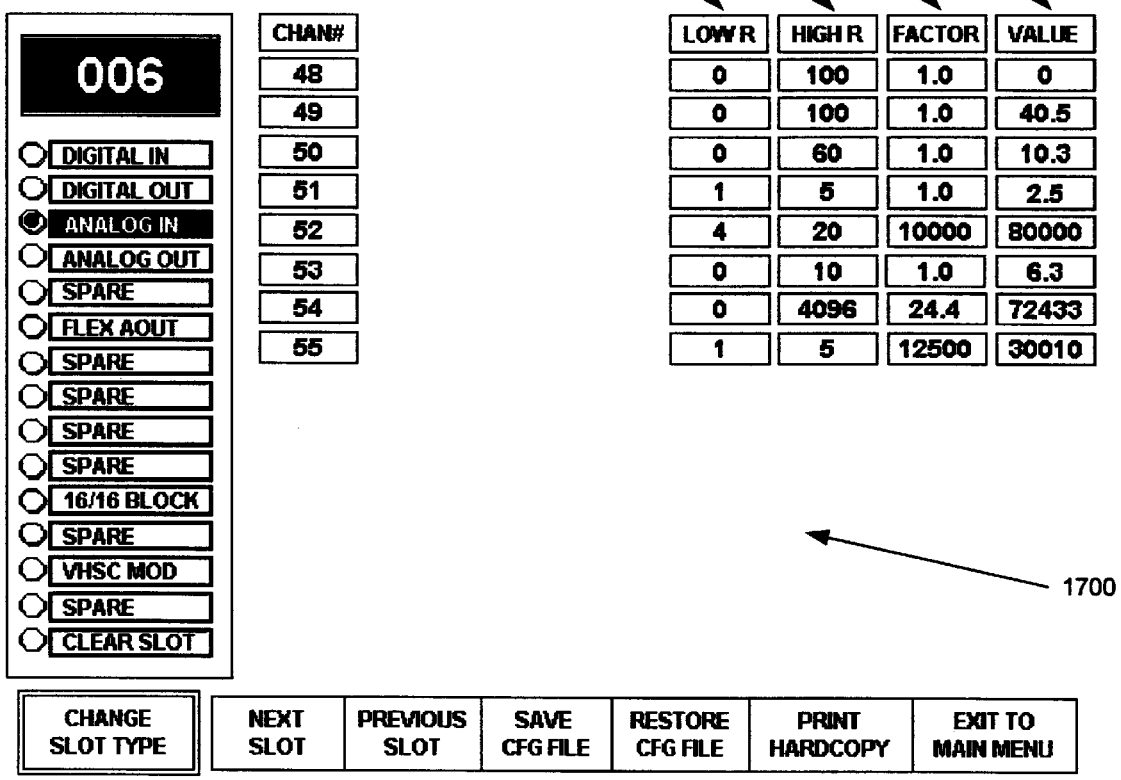
FIG. 17 shows a configuration screen for a ANALOG IN module type according to a preferred embodiment of the invention.

FIG. 17 shows the configuration screen 1700 for the ANALOG IN module type. The ANALOG IN module type, such as an Allen-Bradley® 1771-IFE Analog Input Module, is activated when the programmer clicks on the "CHANGE SLOT TYPE" button 1006 located at the bottom portion 1005 of the configuration screen 1200 of FIG. 12. It should be appreciated that the invention is not limited by the Analog Input Module listed above and that the invention can be practiced by any type of compatible Analog Input Module.

The I/O module selection is indicated as activated for slot number 006 by the ANALOG IN module type being displayed in bold type on configuration screen 1700. In addition, the appropriate configuration and display options or configuration fields for the selected ANALOG IN module type will appear on the configuration screen 1700. Note that the Virtual Rack module 500 automatically determines that the ANALOG IN module type located in slot number 006 will be associated with channel numbers 48–55 (6×8=48+7=55).

The configuration fields displayed by the Virtual Rack module 500 for the ANALOG IN module type are the LOW R configuration field 1702, HIGH R configuration field 1704 and FACTOR configuration field 1706. The LOW R configuration field 1702 and the HIGH R configuration field 1704 allows the programmer to specify the minimum and maximum signal range for the ANALOG IN module type, respectively. For example, channel number 48 is connected to a pressure transducer with a range of 0 to 100 psi. As shown in FIG. 17, the LOW R configuration field 1702 and the HIGH R configuration field 1704 have been set to match the pressure transducers' signal range. The FACTOR configuration field 1706 allows for an engineering scaling factor to be entered by the programmer for each channel. For example, channel number 52 has a weight scale with a range of 0 to 160,000 lbs when connected. The scale sends a 4 to 20 ma electrical signal to this channel in proportion to the weight. Because there is a 16 ma resolution (20–4=16 ma) and the range of the device is 160,000, then it can be determined that 10,000 (160,000/16=10,000) is the correct factor to transform the electrical signal to weight (lbs).

In addition, the configuration screen 1700 includes the VALUE 1708 for each channel of the ANALOG IN module type. The VALUE 1708 for each channel indicates the current ranged and factored analog signal value for each channel. For example, channel number 52 has a range of 160,000 (16 max×10,000=160,000). The "VALUE" indicates 80,000, or 50% (80,000/160,000) of the range.

Figure 18:
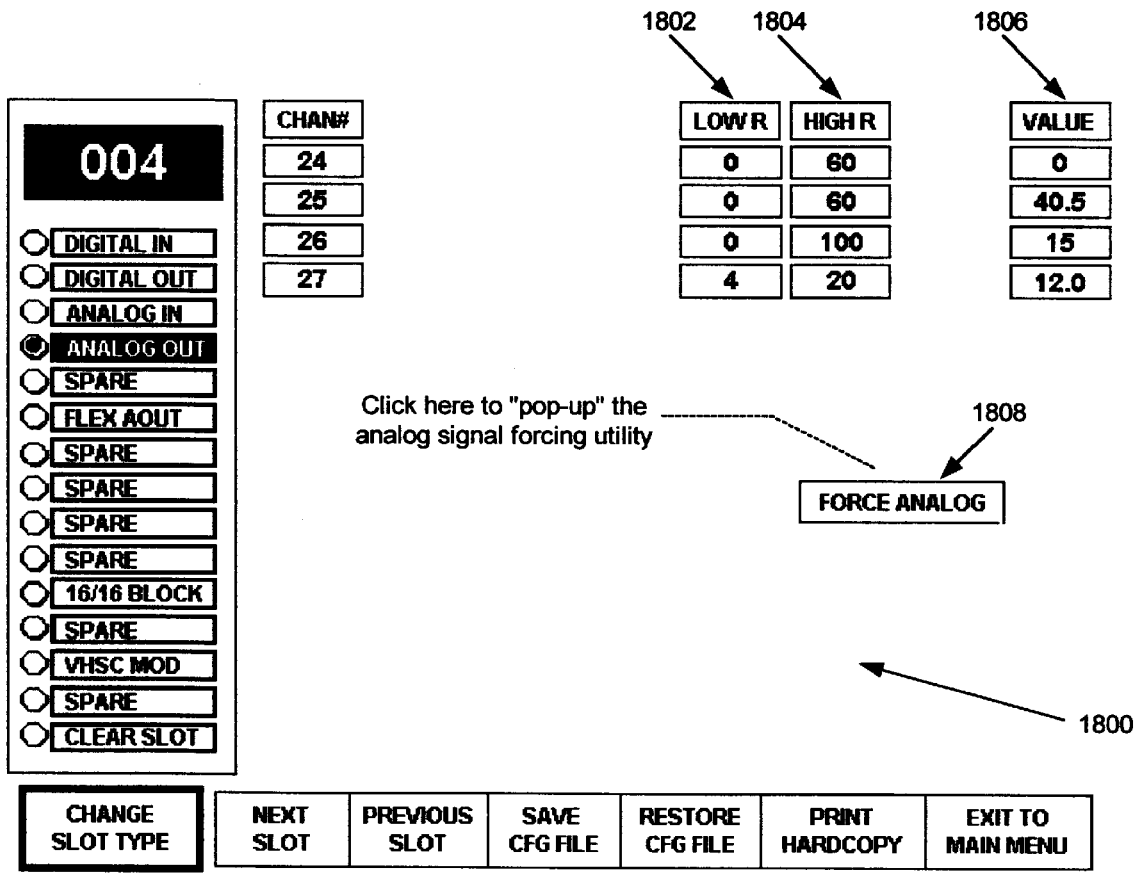
FIG. 18 shows a configuration screen for a ANALOG OUT module type according to a preferred embodiment of the invention.

FIG. 18 shows the configuration screen 1800 for the ANALOG OUT module type. The ANALOG OUT module type, such as an Allen-Bradley® 1771-OFE Analog Output Module, is activated when the programmer clicks on the "CHANGE SLOT TYPE" button 1006 located at the bottom portion 1005 of the configuration screen 1200 of FIG. 12. It should be appreciated that the invention is not limited by the Analog Output Module listed above and that the invention can be practiced by any type of compatible Analog Output Module.

The I/O module selection is indicated as activated for slot number 004 by the ANALOG OUT module type being displayed in bold type adjacent the filled radio button on configuration screen 1800. In addition, the appropriate configuration and display options or configuration fields for the selected ANALOG OUT module type appear on the configuration screen 1800. Note that the Virtual Rack module 500 automatically determines that the ANALOG OUT module type located in slot number 004 will be associated with channel numbers 16–19 (4×4=16+3=19).

The configuration fields displayed by the Virtual Rack module 500 for the ANALOG OUT module type are the LOW R configuration field 1802 and HIGH R configuration field 1804. The LOW R configuration field 1802 and the HIGH R configuration field 1804 allow the programmer to specify the minimum and maximum signal range for an analog channel, respectively. For example, channel number 16 is connected to a pressure regulator with a range of 0 to 60 psi. As shown in FIG. 18, the LOW R configuration field 1802 and the HIGH R configuration field 1804 have been set at 0 and 60, respectively, to match the pressure transducers' signal range.

In addition, the configuration screen 1800 includes the VALUE 1806 for each channel of the ANALOG OUT module type. The VALUE 1806 for each channel indicates the current ranged and factored analog signal value for each channel. For example, channel number 19 has a range of 16 (20–4). The "VALUE" configuration field indicates 12.0, or 75% (12/16) of the range for the regulator.

Figure 19:
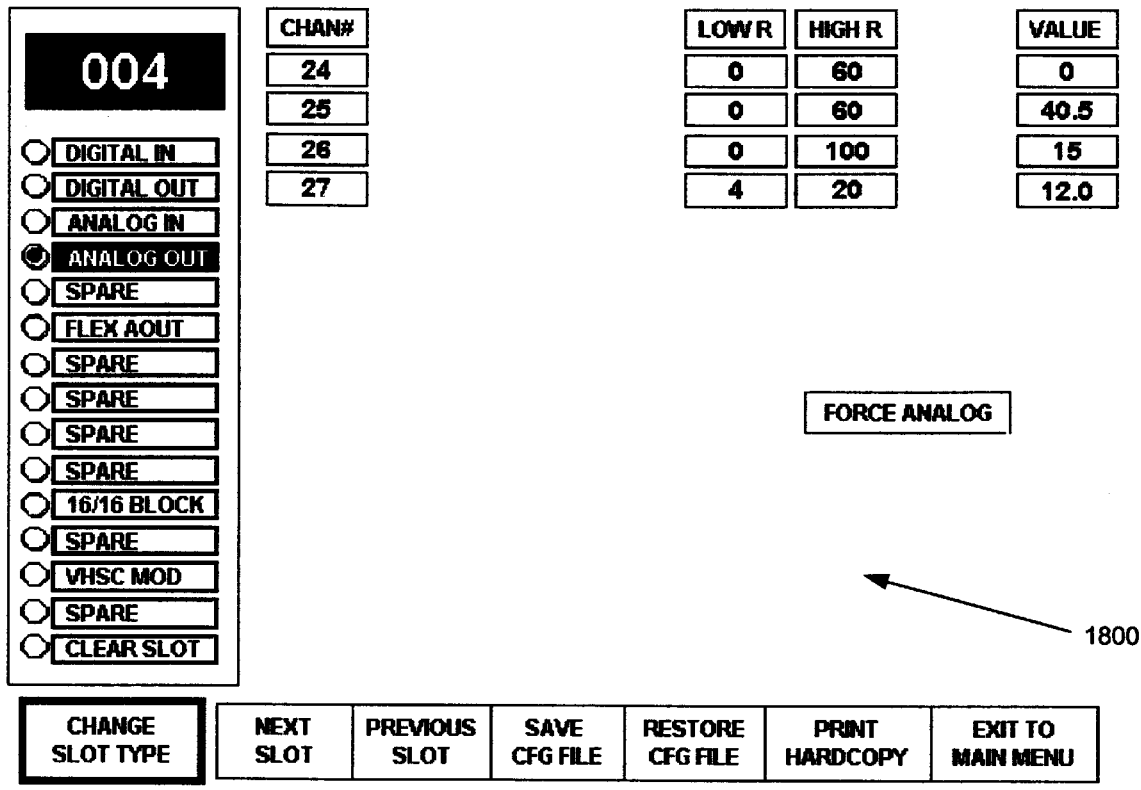
FIG. 19 shows a configuration screen for a ANALOG OUT module type of FIG. 18 when the forcing signal utility is selected.
Figure 19:
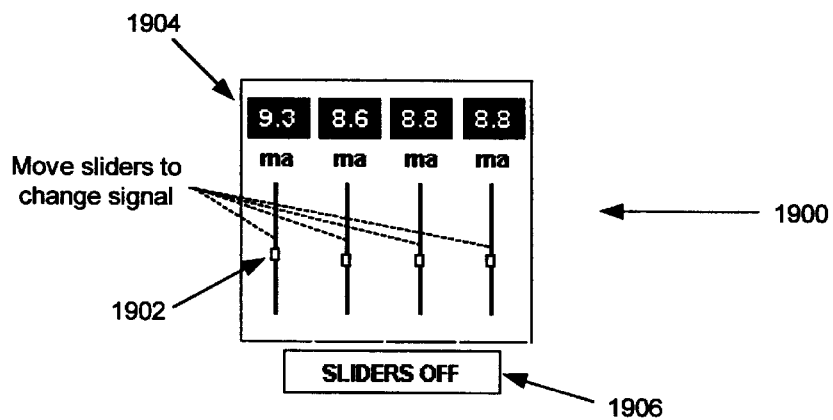

By depressing the F11 function key on the keyboard input device while the ANALOG OUT module type is activated, the programmer can cause a FORCE ANALOG button 1808 to "pop-up" on the ANALOG OUT configuration screen 1800. By clicking on the FORCE ANALOG button 1808, the programmer can cause the analog signal forcing utility 1900 to "pop-up" as illustrated in FIG. 19. The analog signal forcing utility 1900 allows the programmer to check the operation of field devices by directly forcing a current signal to a particular device. For example, a fluid regulator connected to channel number 16 has a range of 0 to 60 psi. The fluid regulator can be operated through its' range moving a slider 1902, corresponding to channel number 16, up and down with a curser. The analog signal forcing utility 1900 indicates the current output of the regulator in milliamps in a display box 1904 located directly above slider 1902. In this manner, the programmer or installer can verify that the regulator is wired and plumbed correctly. The above procedure can be repeated for each channel, 16–19, of the ANALOG OUT module type. When finished, the programmer can then click on the SLIDERS OFF button 1906 to close down the analog signal forcing utility 1900 and return to configuration screen 1700.

Figure 20:
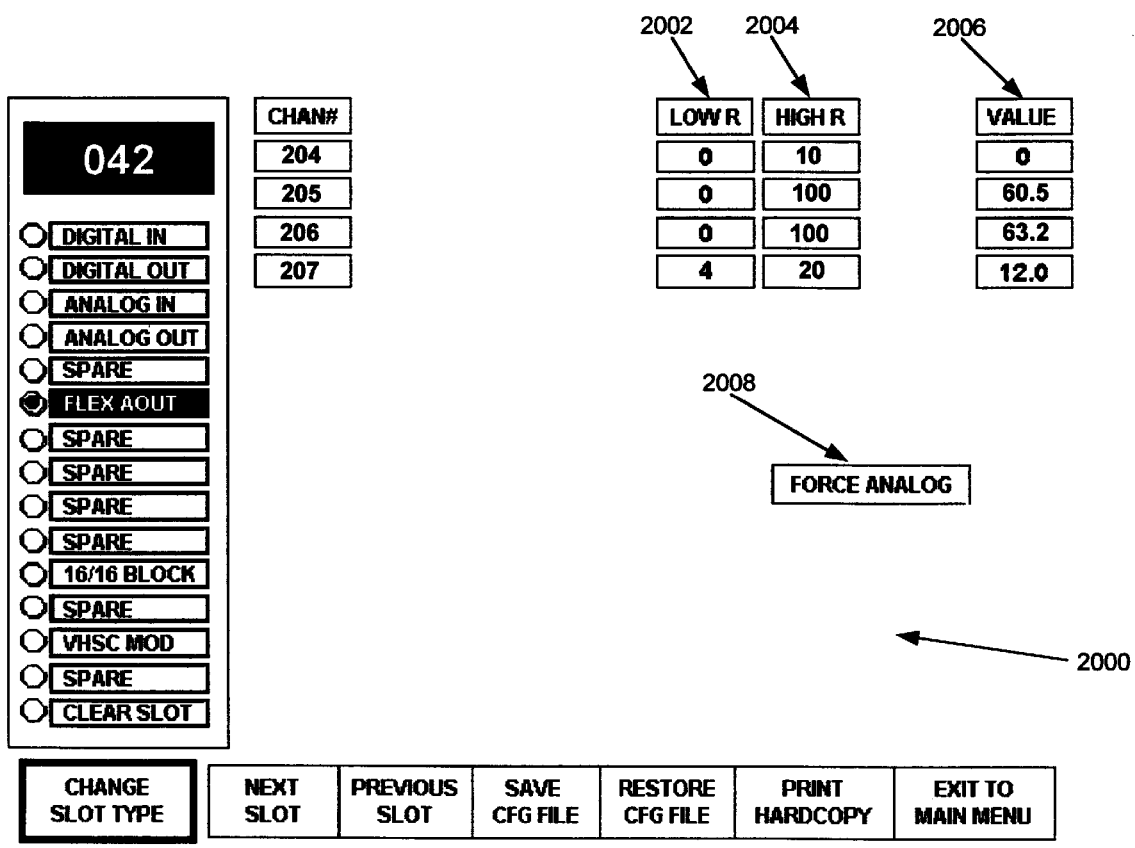
FIG. 20 shows a configuration screen for a FLEX AOUT module type according to a preferred embodiment of the invention.

FIG. 20 shows the configuration screen 2000 for the FLEX AOUT module type. The Flex type analog output module, such as an Allen-Bradley® 1794-OE4 Flex Analog Output Module, is similar to the ANALOG OUT module type described above, but is significantly different "under the hood" to warrant a separate selection in the Virtual Rack module 500. The FLEX AOUT module type is activated when the programmer clicks on the "CHANGE SLOT TYPE" button 1006 located at the bottom portion 1005 of the configuration screen 1200 of FIG. 12. Other Flex Analog Modules compatible with the Virtual Rack I/O module 500 include the Allen-Bradley® 1794-OE4 and 1794-OE4/B. It should be appreciated that the invention is not limited by the Flex Analog Output Modules listed above and that the invention can be practiced by any type of compatible Flex Analog Output Module.

The I/O module selection is indicated as activated for slot number 042 by the FLEX AOUT module type being displayed in bold type on configuration screen 2000. In addition, the appropriate configuration and display options or configuration fields for the selected ANALOG IN module type will appear on the configuration screen 2000. Note that the Virtual Rack module 500 automatically determines that the FLEX AOUT module type located in slot number 042 will be associated with channel numbers 168–171 (42×4= 168+3=171).

Similar to the configuration screen 1800 for the ANALOG OUT module type described above, the configuration fields displayed by the Virtual Rack module 500 for the FLEX AOUT module type are the LOW R configuration field 2002 and HIGH R configuration field 2004. The LOW R configuration field 2002 and the HIGH R configuration field 2004 allow the programmer to specify the minimum and maximum signal range for an analog channel, respectively. For example, channel number 170 is connected to a pressure regulator with a range of 0 to 100 psi. As shown in FIG. 20, the LOW R configuration field 2002 and the HIGH R configuration field 2004 have been set at 0 and 100, respectively, to match the pressure transducers' signal range.

In addition, the configuration screen 2000 includes the VALUE 2006 for each channel of the FLEX AOUT module type. The VALUE 2006 for each channel indicates the current ranged and factored analog signal value for each channel. For example, channel number 170 has a range of 100 (100–0). The "VALUE" configuration field indicates 53.2, or 53.2% of the range for the regulator.

Figure 21:
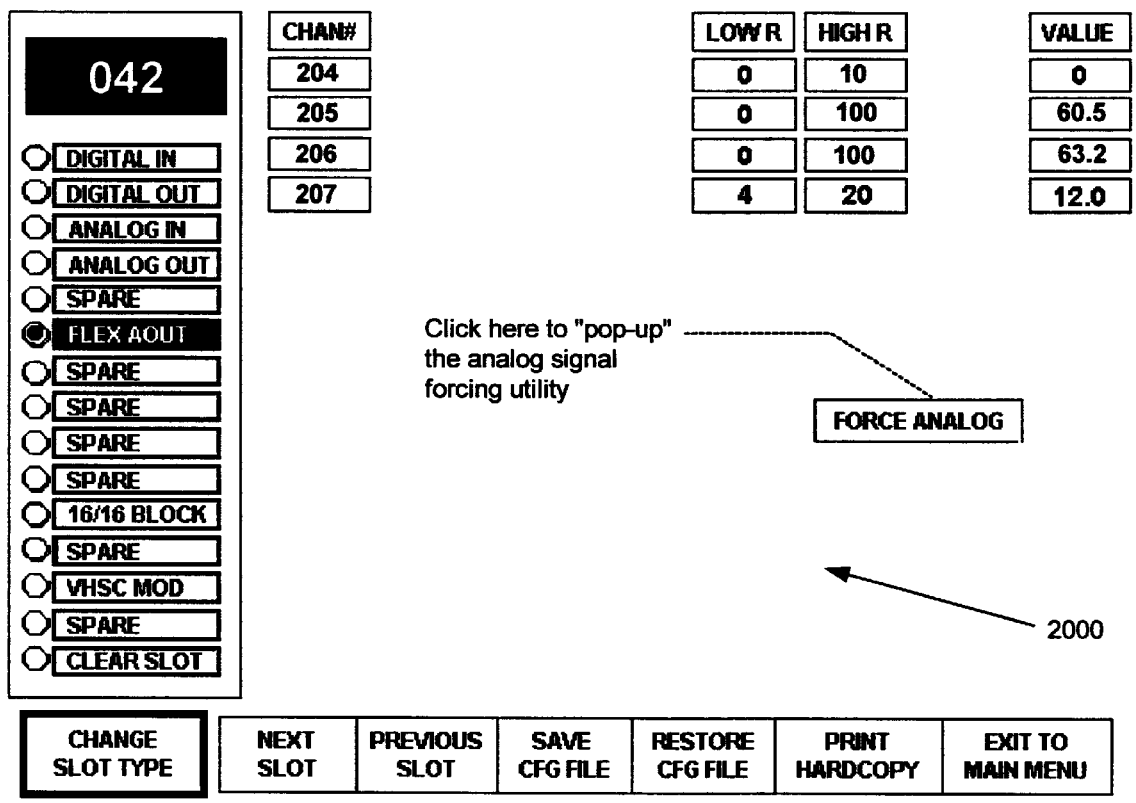
FIG. 21 shows a configuration screen for a FLEX AOUT module type of FIG. 20 when the forcing signal utility is selected.
Figure 21:
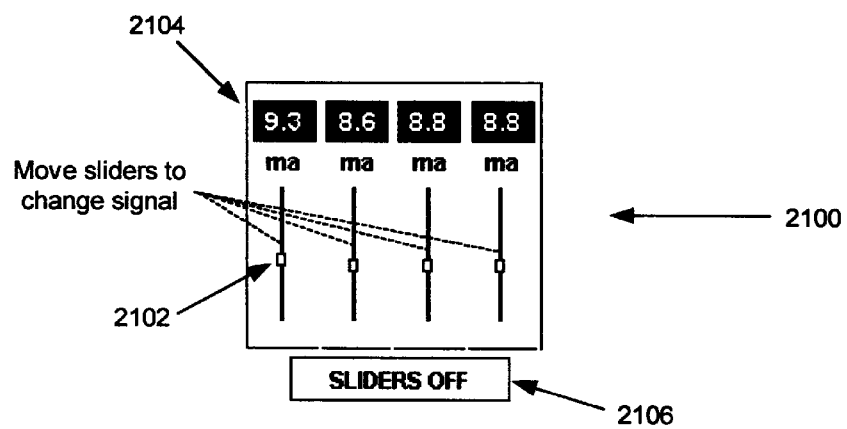

By depressing the F11 function key on the keyboard input device while the FLEX AOUT module type is activated, the programmer can cause a FORCE ANALOG button 2008 to "pop-up" on the ANALOG OUT configuration screen 2000. By clicking on the FORCE ANALOG button 2008, the programmer can cause the analog signal forcing utility 2100 to "pop-up" as illustrated in FIG. 21. Similar to the analog forcing utility 1900 for the ANALOG OUT module type, the analog signal forcing utility 2100 for the FLEX AOUT module type includes a slider 2102, corresponding to channel number 168, a display box 2104 located directly above slider 2102 and a SLIDERS OFF button 2106. The operation of the analog forcing utility 2100 is identical to the analog signal forcing utility 1900 described above. As a result, the discussion will be omitted for brevity.

Figure 22:
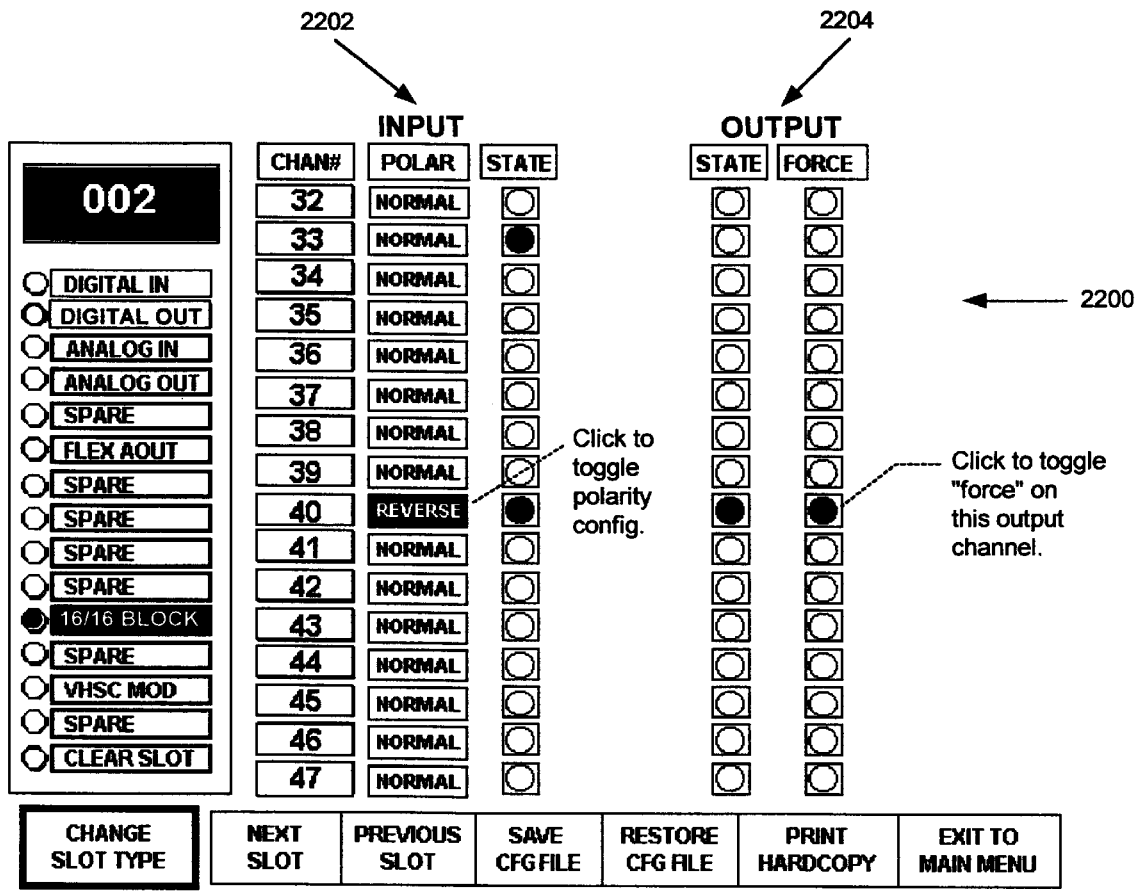
FIG. 22 shows a configuration screen for a 16/16 BLOCK module type according to a preferred embodiment of the invention.

FIG. 22 shows the configuration screen 2200 for the 16/16 BLOCK module type. The 16/16 Block refers to a group of Digital I/O Modules, such as an Allen-Bradley® 1791-16BC Module, that have 32 contacts, rather than 16 contacts. These modules have 16 Digital input contacts and 16 Digital output contacts for each slot. The "16/16 BLOCK" module type is activated when the programmer clicks on the "CHANGE SLOT TYPE" button 1006 located at the bottom portion 1005 of the configuration screen 1200 of FIG. 12. Other 16/16 BLOCK module or Digital Input/Output Modules compatible with the Virtual Rack I/O module 500 include the Allen-Bradley® 1791-16AC, 1791-OA32, 1791-32AO, Fanuc AB RIO, ABB AB RIO, 1771-IAN, 1171-IBN, 1771-IVN, 1771-OAN, 1771-OBN, 1771-OVN and 1771-OWNA. It should be appreciated that the invention is not limited by the Digital Input/Output Modules listed above and that the invention can be practiced by any type of compatible Digital Input/Output Module.

The I/O module selection is indicated as activated for slot number 002 by the 16/16 BLOCK module type being displayed in bold type on configuration screen 2200. In addition, the appropriate configuration and display options or configuration fields for the selected 16/16 BLOCK module type will appear on the configuration screen 2200. Note that the Virtual Rack module 500 automatically determines that the 16/16 BLOCK module type located in slot number 002 will be associated with channel numbers 32–47 (2×16= 32+15=47).

In addition to the channel numbers, an INPUT section 2202 and an OUTPUT section 2204 are displayed on configuration screen 2200 corresponding the Digital input section and the Digital output section of the 16/16 BLOCK module type, respectively. The operation and configuration of the INPUT section 2202 is identical to the operation and configuration of the DIGITAL IN module type described above. Similarly, the operation and configuration of the OUTPUT section 2204 is identical to the DIGITAL OUT module type described above. Consequently, the discussion will be omitted here for brevity.

Figure 23:
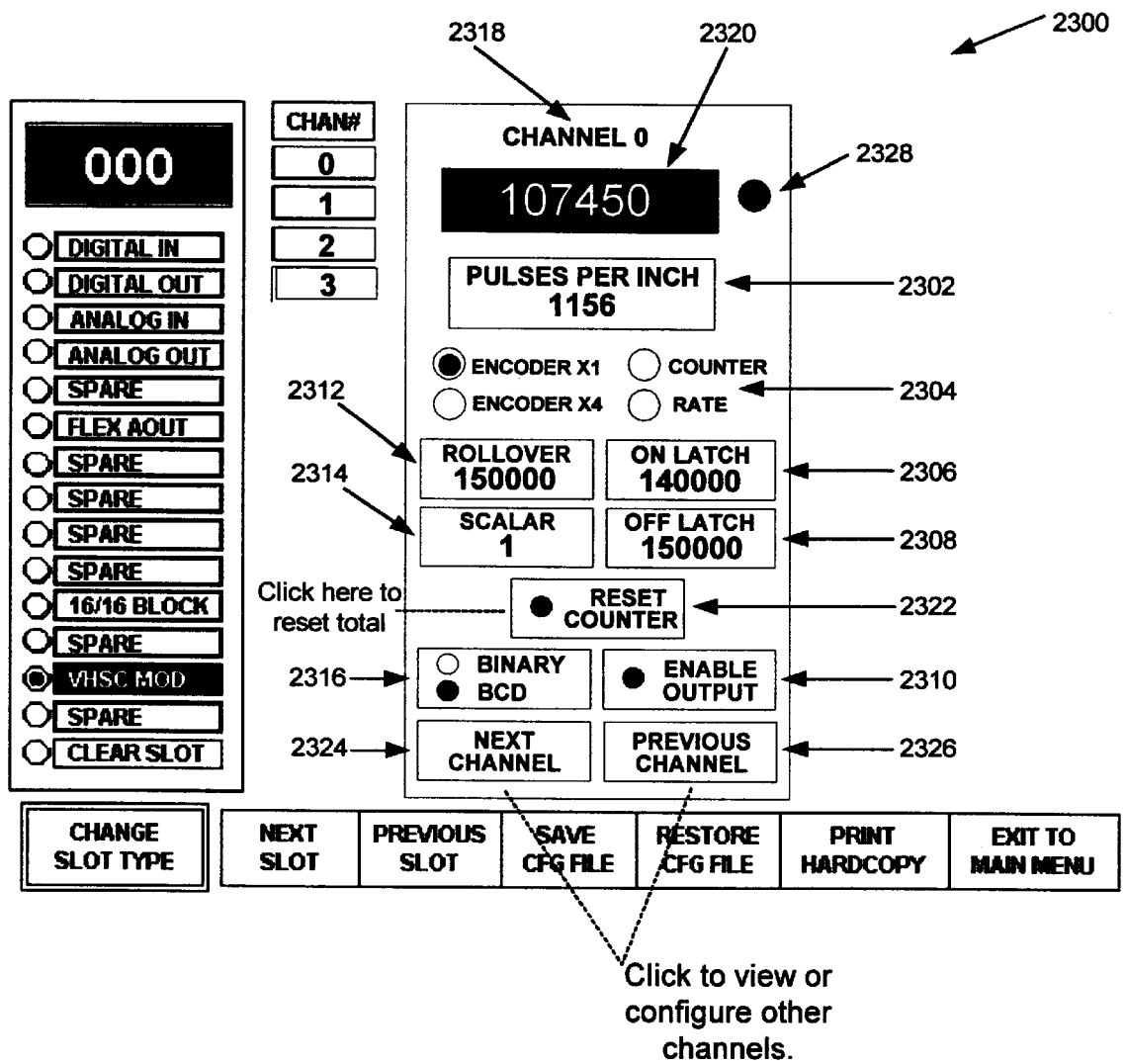
FIG. 23 shows a configuration screen for a VHSC module type according to a preferred embodiment of the invention.

FIG. 23 shows the configuration screen 2300 for the VHSC module type. The VHSC module type, such as an Allen-Bradley® 1771-VHSE Very High Speed Counter Module, is activated when the programmer clicks on the "CHANGE SLOT TYPE" button 1006 located at the bottom portion 1005 of the configuration screen 1200 of FIG. 12. It should be appreciated that the invention is not limited by the Very High Speed Pulse Counter Module listed above and that the invention can be practiced by any type of compatible Pulse Counter Module.

The I/O module selection is indicated as activated for slot number 000 by the VHSC module type being displayed in bold type on configuration screen 2300. In addition, the appropriate configuration and display options or configuration fields for the selected VHSC module type will appear on the configuration screen 2300. Note that the Virtual Rack module 500 automatically determines that the VHSC module type located in slot number 000 will be associated with channel numbers 0–3 (0×16=0+3=3).

The configuration fields displayed by the Virtual Rack module 500 for the VHSC module type are the PULSES PER INCH configuration field 2302, the COUNTER MODE configuration field 2304, the ON LATCH configuration field 2306, the OFF LATCH configuration field 2308, the ENABLE OUTPUT configuration field 2310, the ROLL- OVER configuration field 2312, the SCALAR VALUE configuration field 2314 and the NUMBER FORMAT configuration field 2316.

The PULSES PER INCH configuration field 2302 allows the programmer to determine the encoder travel speed. As seen in FIG. 23, the number of pulses per inch of travel is indicated in the PULSES PER INCH configuration field 2302 as 1156. The COUNTER MODE configuration field 2304 allows the programmer to assign the correct counter mode (ENCODER X1, ENCODER X4, COUNTER and RATE) by clicking on the radio button for the appropriate counter mode. In FIG. 23, the ENCODER X1 counter mode has been selected.

The ON LATCH configuration field 2306, the OFF LATCH configuration field 2308 and the ENABLE OUTPUT configuration field 2310 allow the programmer to assign the count value to trigger an output contact to be energized. For example, a meter in a bottling operation may need 140,000 pulses to fill a bottle. When the ON LATCH configuration field 2306 setting of 140,000 is reached, an output contact is energized that indexes the conveyor to the next bottle. Similarly, the OFF LATCH configuration field 2308 setting of 150,000 will denergize the output contact when 150,000 pulses are reached. The values for the ON LATCH configuration field 2306 and OFF LATCH configuration field 2308 can be set by the programmer by clicking on the appropriate configuration field and entering the appropriate value. The ENABLE OUTPUT configuration field 2310 allows the programmer to turn on and off the digital output by clicking on the radio button.

The ROLLOVER configuration field 2312 allows the programmer to specify a counter value that initiates a "clear" of the total and the counter begins from zero. For example, a system needs to know when 150000 pulse of conveyor travel has occurred because at that distance a part to be picked up by a robot will be waiting. The SCALAR VALUE configuration field 2314 allows the programmer to assign a multiplier to the counter values. In FIG. 23, the value for the SCALAR VALUE configuration field 2314 is set equal to one, indicating that the counter values are multiplied by one. The values for the ROLLOVER configuration field 2312 and the SCALAR VALUE configuration field 2314 can be set by the programmer by clicking on the appropriate configuration field and entering the appropriate value.

The NUMBER FORMAT configuration field 2316 allows the programmer to select the preferred number format for the counter by clicking on the appropriate radio button. As illustrated in FIG. 23, the "BCD" (binary coded decimal) number format has been selected.

In addition, the VHSC configuration screen 2300 displays the COUNTER CHANNEL 2318 configuration field located at the top portion of the VHSC configuration screen 2300 and the current COUNTER TOTAL 2320 indicating the current counter total for the selected channel. As illustrated in FIG. 23, the current counter total for channel number 0 is 107450. The current counter total can be reset by the programmer to zero by clicking on the radio button adjacent the RESET COUNTER 2322 display located at the middle portion of the VHSC configuration screen 2300. The channel number can be changed by clicking on the NEXT CHANNEL button 2324 and the PREVIOUS CHANNEL button 2326 located on the bottom portion of the VHSC configuration screen 2300.

The VHSC configuration screen 2300 also indicates the state 2328 of the counter latching output contact being displayed by the Virtual Rack module 500. As seen in FIG. 23, the STATE 2328 of the counter latching output contact is indicated as "ON" (filled radio button).

The following compares a simple application using the standard or conventional approach and the generic approach according to a preferred embodiment of the invention.

Figure 24:
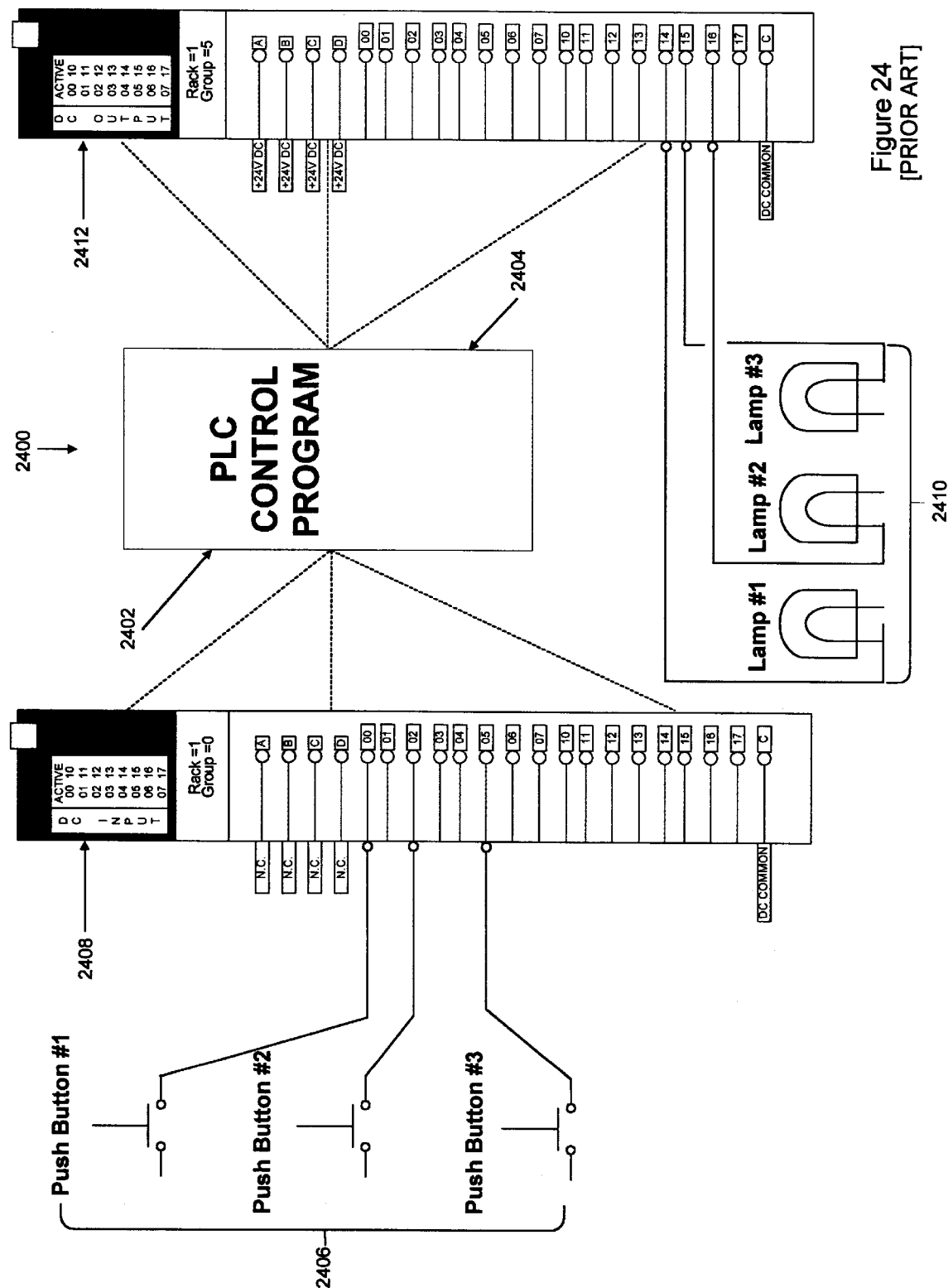
FIG. 24 shows a conventional control system for a simple application using a standard approach.

Using the standard or conventional approach, FIG. 24 shows a control system 2400 comprising a main control program 2402 downloaded into the memory of PLC 2404. The control system 2400 also includes three Push Buttons 2406 connected to a Digital Input card 2408 located at Rack 01, Group 0, and three Lamps 2410 connected to a Digital Output card 2412 located at Rack 01, Group 5.

The three Push Buttons 2406 with normally open contacts are wired to a PLC Digital input card 2408. In particular, Push Button #1 is connected to contact 00, push button #2 is connected to contact 02 and push button #3 is connected to contact 05. When one of the three Push Buttons 2406 is pressed, the main control program 2402, preferably written using the relay ladder logic language, turns on a corresponding Lamp 2410 by energizing the contact on the Digital output card 2412 connected to that particular lamp. As seen in FIG. 24, Lamp #1 is connected to contact 14, Lamp #2 is connected to contact 16 and Lamp #3 is connected to contact 15 of the Digital Output card 2412.

Figure 25:
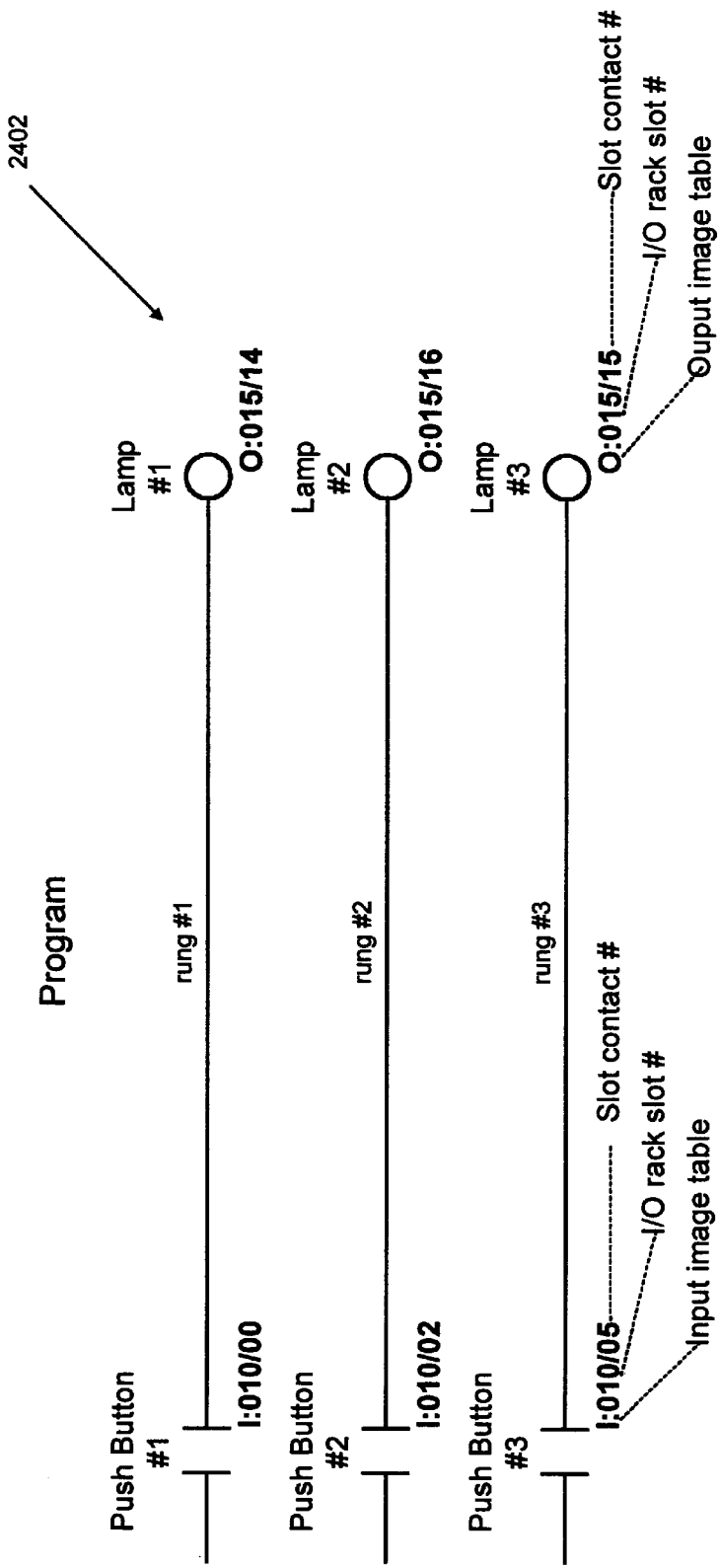
FIG. 25 shows a conventional control program using relay ladder logic programming for the simple application of FIG. 24.

FIG. 25 shows the main control program 2500 for the standard or conventional approach. In the first "rung", the contact on the left side of the rung is examined by the PLC 2404. For example, when one of the Push Buttons 2406 is pressed, for example Push Button #1, current flows to the Digital Input card 2408 and energizes the contact and the PLC 2404 "reads" this contact in its Input Table as true or "ON". On the other hand, if the one of the Push Buttons 2406 has not been pressed, then the contact will be examined as false of "OFF". If the contact is true, then the PLC 2404 allows power to flow to the right or output side of the rung, thereby energizing or turning on the corresponding bit in the Output Image table of the PLC 2404. When the contact is energized in the Output Image table of the PLC 2404, the Digital Output card 2412 turns on power to that contact and the corresponding Lamp 2410 wired to that output is energized. The PLC 2404 uses an addressing scheme in the control program 2402 to reference real or "hard-wired" contacts in the field.

Using the standard approach, the programmer locates the wiring diagrams that show the contact landings for the Push Buttons and Lamps. After noting the contact landings on the PLC I/O cards, 2408, 2412, the programmer then writes the main control program 2402 referencing those contacts. The main control program 2402 is preferably created using relay ladder logic programming language. It is well-known that a ladder logic program comprises a listing of "rungs", or logic statements that control one or more bits based on the state of the other bits examined. An input instruction, generally used on the left side of the "rung", examines the status of input and output bits. An output instruction, generally used on the right side of the "rung", controls the state of a bit or bits based on the conditioning instructions. Each input and output instruction generates a "rung" element. However, as each input instruction is executed, the addressed bit is examined to see if it matches a certain condition (on or off). If the input is true, the rung element is set true. Input instructions must contain a continuous path of true elements from the start of the rung to the output instruction for the output instruction to be enabled. If a rung element is unconditioned, the output instruction is always enabled. The programming terminal intensifies bit instructions that are logically true when the processor is in Run mode or Test mode.

In ladder logic, the first part of the address represents the contact type; "I" (Input) or an "O" (Output). The second part of the address represents the I/O rack slot number (rack and group number) where the I/O card has been installed. The third part of the address references the contact number of the designated slot number.

To program the first rung, the programmer enters the address of I:010/00 for Push Button #1, representing an Input contact type located at rack slot number 010 and connected to contact number 00 for the left side of the rung, and the address of O:015/14 for Lamp #1, representing an Output contact type located at rack slot number 015 and connected to contact number 14 for the right side of the rung. To program the second and third Push Buttons and Lamps, the programmer enters the addresses for the second and third rungs in a similar fashion to complete the main control program 2402.

Figure 26:
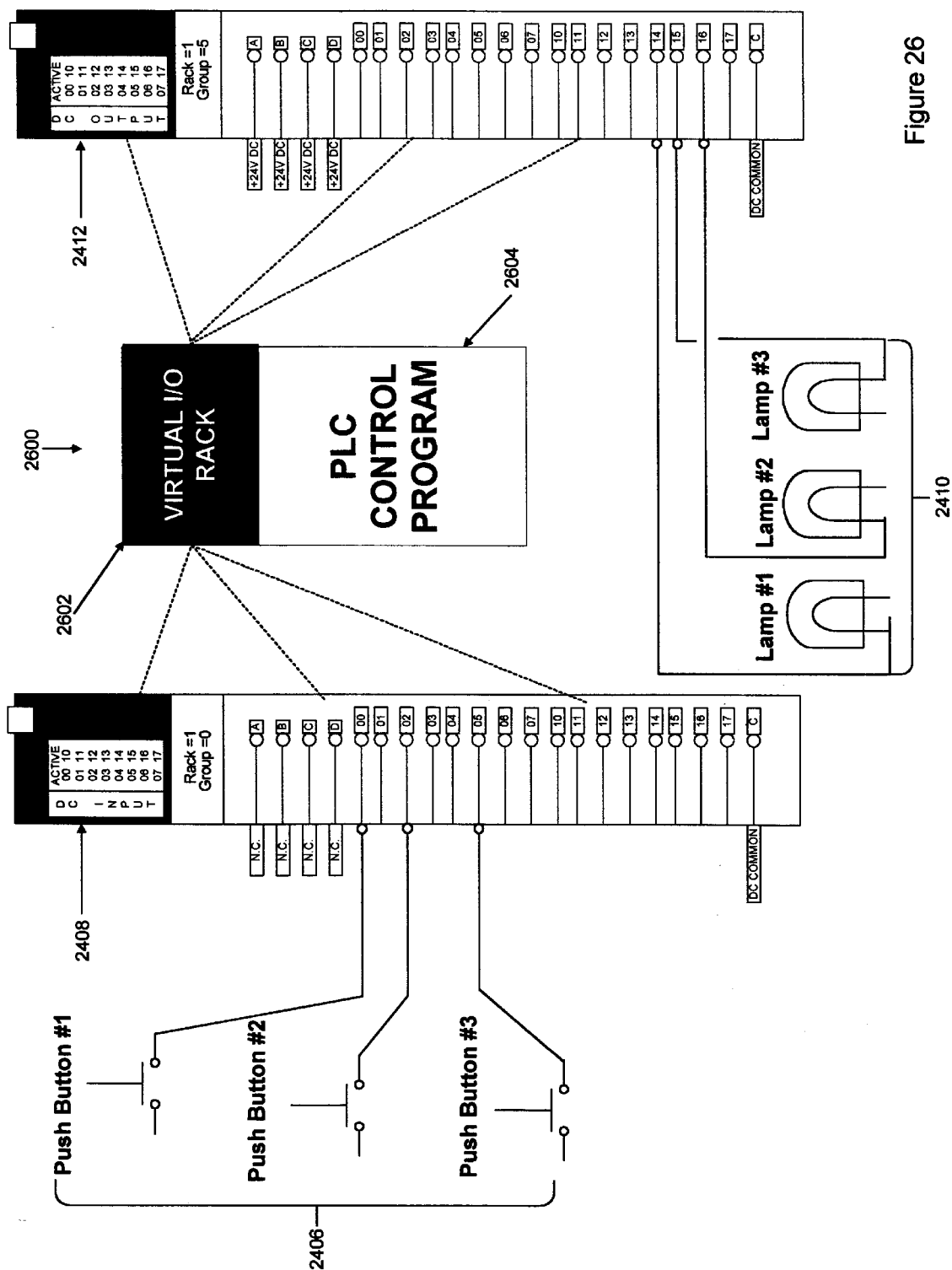
FIG. 26 shows a generic control system for the simple application using a Virtual Rack module according to a preferred embodiment of the invention.

FIG. 26 shows a generic method or approach of a generic control system 2600 according to a preferred embodiment of the invention.

Using the generic approach with the Virtual Rack module 2602, the programmer first writes the main control program 2604 using channel number references to create a software "engine." At this time, the programmer does not need to know where the devices will be wired to on the I/O cards 2408, 2412. Next, the programmer writes a generic program or a software "engine" not needing to know the wiring locations or how many devices will be wired. Then, the programmer creates a configuration screen or enters the PLC I/O addresses manually on the PLC I/O cards 2408, 2412, so that the "engine" can be configured to handle many variations of the system application. Preferably the configuration screen is written using the WINVIEW® software on programming terminal 108. Finally, the programmer uses the configuration screens of the Virtual Rack module 2602 or enters the PLC I/O contact addresses manually to link the Virtual Rack channel numbers to the PLC I/O contacts addresses for the PLC I/O cards 2408, 2412.

Using relay ladder logic for writing the main control program 2604 of the generic control system 2600, symbols that are associated with and used interchangeably for PLC addresses are used to refer to Memory addresses and Virtual Rack channel number assignments. Symbolic ladder logic programming allows the programmer to refer to bits and words using easy to remember text symbols instead of complex addresses. While symbolic programming has the ability to simplify programming and some ladder logic programming packages allow text symbols to be reassigned, there is still a shortcoming. Text symbols cannot be mathematically manipulated by the program. The Virtual Rack channel numbers are numbers and therefore can be manipulated by the program as in a For/Nxt loop construct, etc. The Virtual Rack adds the necessary ingredient to create I/O independent, generic concept control systems. The Virtual Rack creates numeric "arrays" of various I/O types in the PLC memory and the programmer needs to only to refer or "point" to the correct array type and then place a symbol (variable) that refers to the Virtual Rack channel number in the control program. Then, the actual Virtual Rack channel number can be configured at runtime and the variable or symbol is replaced with the Virtual Rack channel number. Using symbolic channel number references, the programmer does not need to know where the field devices are wired to on the PLC I/O cards 2048, 2412. Symbolic ladder logic programming and automatic attachment of addresses is described in U.S. Pat. No. 5,243,511, herein incorporated by reference. In summary, the Virtual Rack allows I/O to be configured and identified to match the control program, rather than matching the control program to the I/O configuration and assignment.

Figure 27:
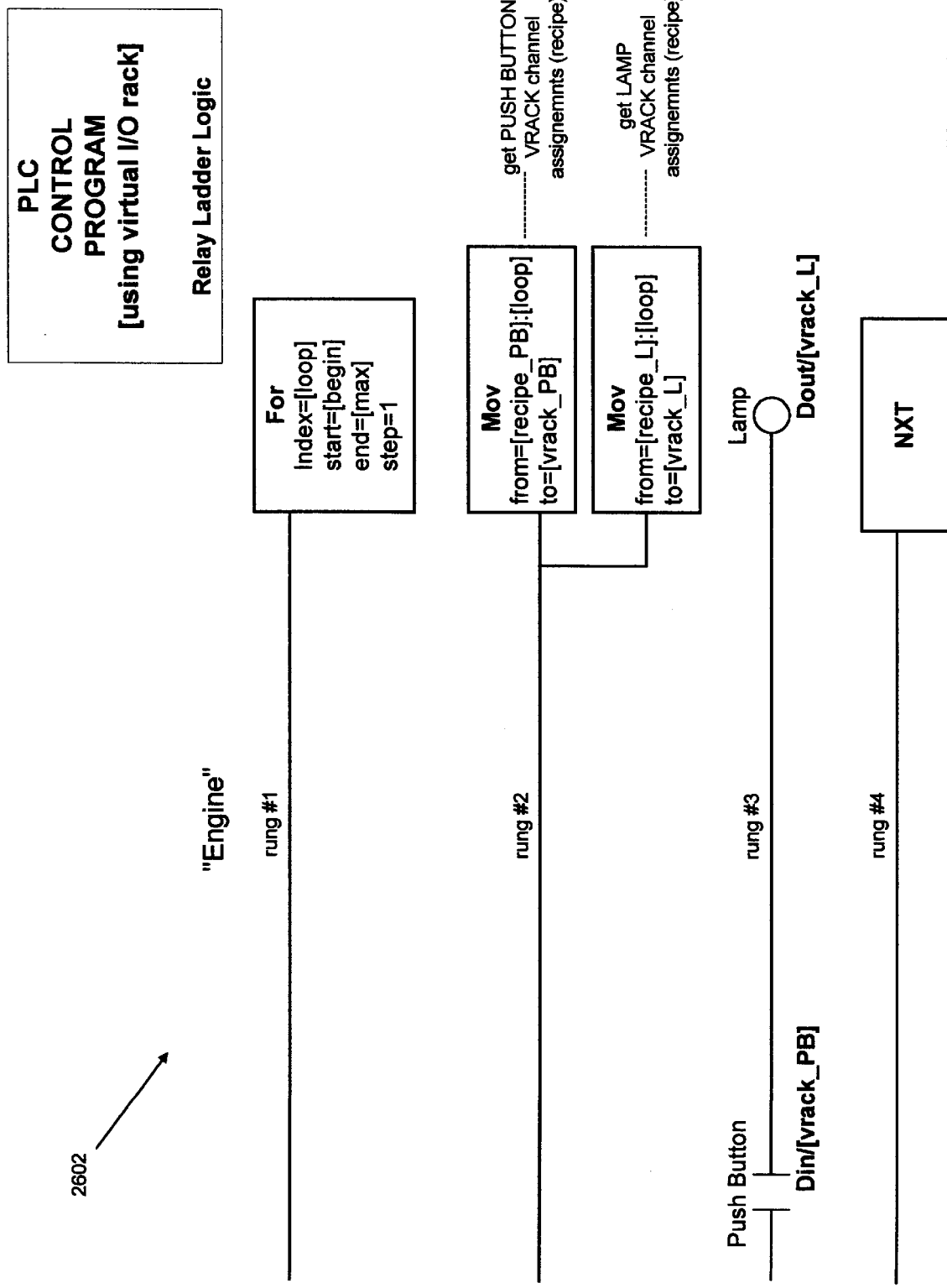
FIG. 27 shows a generic control program or software "engine" using "symbolic" ladder logic programming for the simple application of FIG. 24.

FIG. 27 shows a main control program 2604 using the generic approach for the system application of FIG. 24. The main control program 2604 comprises four "rungs," preferably using the relay ladder logic programming language. In the first rung, a "For-Next Loop" is initiated. Note that [loop], [begin] and [max] are variables. The software "engine" assumes that [begin]=1 and [max]=3. For the first iteration of the loop, [loop]=1. In the second rung, the Virtual Rack I/O channel configurations for the requested Push Button 2406 and Lamp 2410 are loaded into the program using "Mov". Because [loop]=1 in the first iteration, the "recipe" (Virtual I/O channel numbers) for Push Button #1 and Lamp #1 are retrieved by the control program. In the third "rung", the "hard-wired" I/O contact addresses using the standard approach (I:010/00 and O:015/14) for Push Button #1 and Lamp #1 are replaced with symbolic variables din_vrack_PB and dout_vrack_L, respectively. Note that the symbolic addresses, vrack_PB and vrack_L, are free form and can be assigned any alphanumeric expression by the programmer. The first part of the addresses, din and dout, need to be specified by the programmer and refer to the Digital Input Virtual Rack and the Digital Output Virtual Rack, respectively. The last rung (#4) returns the program back to the first "rung" where [loop] is incremented by 1, so that [loop]=2 in the next iteration. Thus, the program runs logic and I/O for Push Button #2 and Lamp #2. The sequence is repeated until [loop]=[max]=3.

Figure 28:
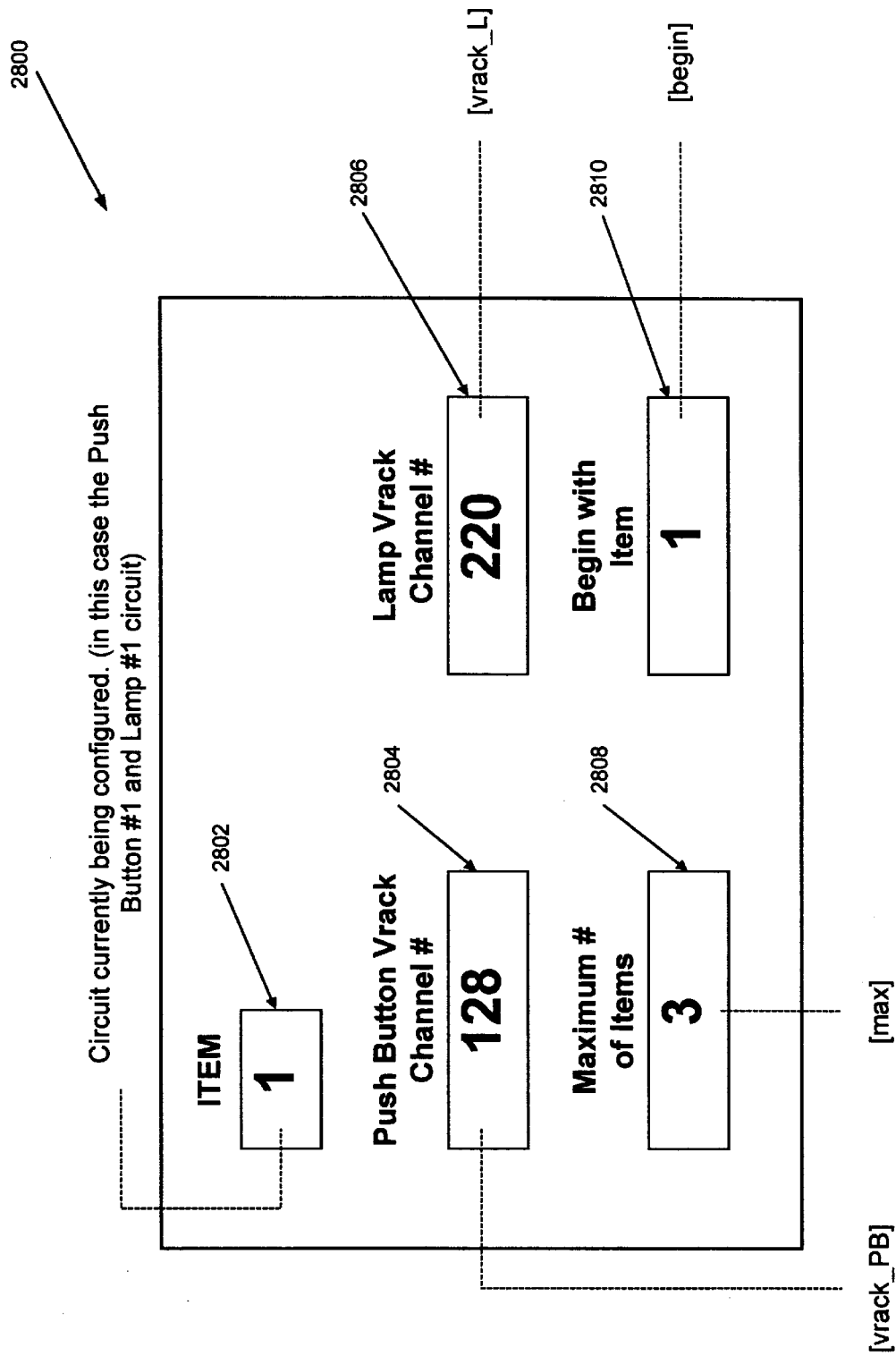
FIG. 28 shows a configuration screen using the Virtual Rack module of FIG. 26 for configuring the simple application of FIG. 24.

FIG. 28 shows a configuration screen 2800 for configuring the variables in the main control program 2604 using the Virtual Rack module 2602. For the above application, the configuration screen 2800 may comprise an ITEM configuration field 2802, a PUSH BUTTON VRACK CHANNEL # configuration field 2804, a LAMP VRACK CHANNEL # configuration field 2806, a MAXIMUM # OF ITEMS configuration field 2808 and a BEGIN WITH ITEM configuration field 2810.

To configure the generic control system 2600, the programmer first configures the circuit for Item #1 (Push Button #1 and Lamp #1) by clicking on the item box and entering a "1" into the ITEM configuration field 2802. The key components to be configured in the generic control system 2600 are the Vrack I/O channel assignments. This is accomplished by the programmer entering "128" (8×16+0 or 8(octal)(i.e., rack 1, group 0)×16+0(octal)) into the PUSH BUTTON VRACK CHANNEL # configuration field 2804 setting variable [vrack_PB]=128. The programmer also enters "220" (13×16+12 or 15(octal)(i.e., rack 1, group 5)×16+14(octal)) into the LAMP VRACK CHANNEL # configuration field 2806 setting variable [vrack_L]=220. Also, the programmer enters "3" into the MAXIMUM # OF ITEMS configuration field 2808 setting variable [max]=3. Finally, the programmer enters "1" into the BEGIN WITH ITEM configuration field 2810 setting variable [begin]=1. The process is repeated for items 2 and 3 (Push Button #2 and Lamp #2, and Push Button #3 and Lamp #3, respectively). At this point, the circuit is functional and the operational equivalent of the standard approach control program 2402 (FIG. 25).

It can be seen from the above discussion that the programmer uses the Virtual I/O Rack configuration screen 2800 to link the Virtual I/O Rack channels numbers to the PLC I/O contact addresses for each I/O module type 2408, 2412. In this manner, the main control program 2602 using the Virtual Rack module 2604 and associated configuration screen 2800 can be used at runtime, i.e., after the generic control system 2600 has been installed and wired, unlike the conventional control system 2400.

An advantage of the generic control system approach using the Virtual Rack module 2604 is realized when the next application requires, for example, 100 Push Buttons, instead of 3 Push Buttons. Using the standard or conventional approach, the programmer must locate the wiring diagrams that show the contact landings for the 100 Push Buttons and 100 Lamps. After noting the contact landings on the PLC I/O cards, the programmer must then reference the additional contacts by adding 97 rungs of ladder logic programming to the original 3 rung program described above. As a result, the programmer has considerably changed the original 3 rung control program by adding 97 new rungs as has developed a new control program to include the additional 97 rungs. By contrast, the programmer does not need to make any changes to the generic control system 2600 using the main control program 2602 and the Virtual Rack module 2604. Instead, the programmer uses the configuration screen 2800 to enable the additional 97 circuits.

Figure 29:
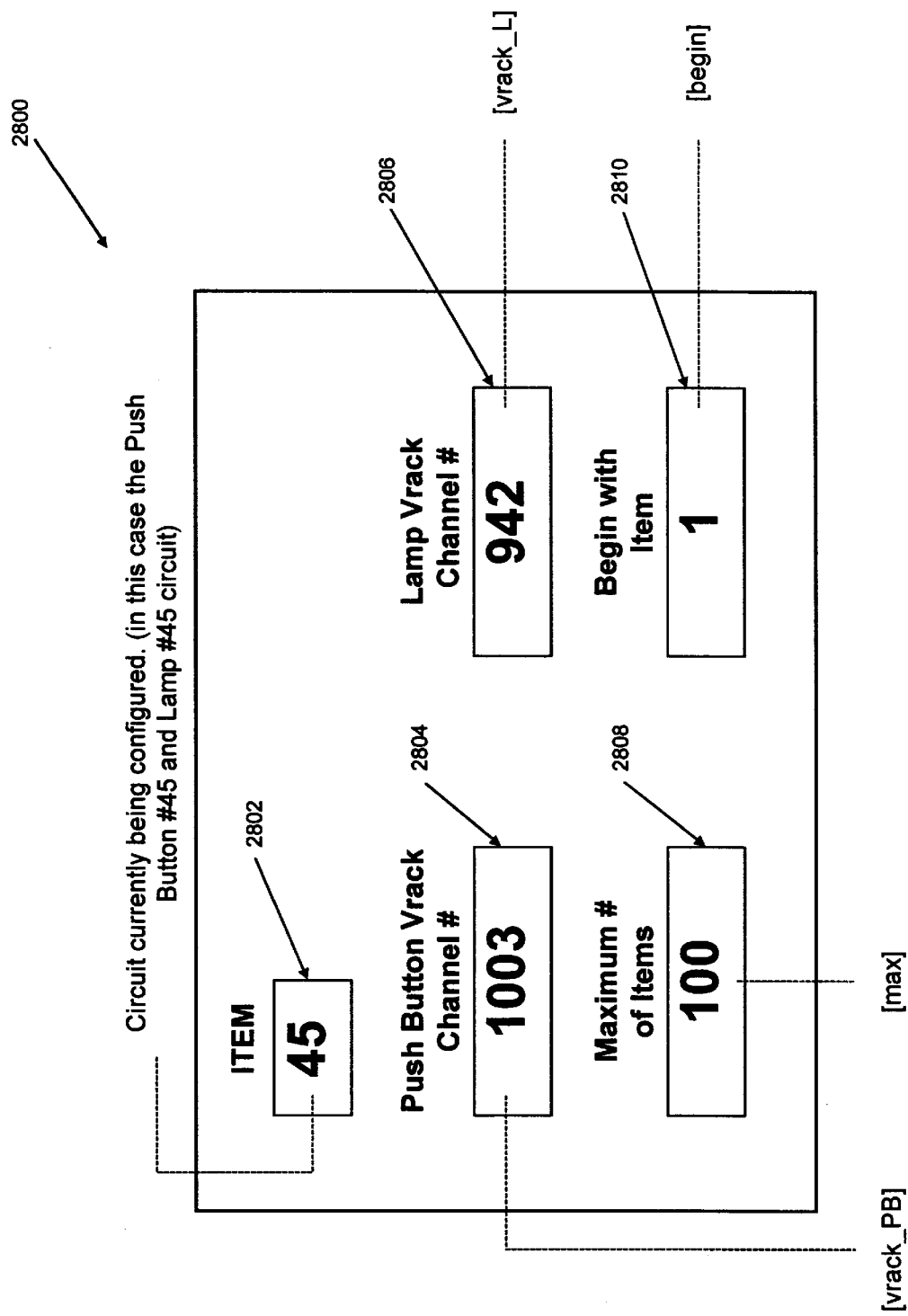
FIG. 29 shows a configuration screen using the Virtual Rack module of FIG. 26 for configuring a more complex application.

As seen in FIG. 29, the programmer first may configure the circuit for Item #45 (Push Button #45 and Lamp #45) by clicking on the item box and entering a "45" into the ITEM configuration field 2802. Next, the programmer may enter "1003" (62×16+11 or 76(octal) (i.e., rack 7, group 6)×16+ 13(octal)) into the PUSH BUTTON VRACK CHANNEL # configuration field 2804 setting variable [vrack_PB]=1003. The programmer may also enter "942" (58×16+2 or 72(octal) (i.e., rack 7, group 2))×16+2(octal) into the LAMP VRACK CHANNEL # configuration field 2806 setting variable [vrack_L]=942. Also, the programmer enters "100" into the MAXIMUM # OF ITEMS configuration field 2808 setting variable [max]=3. Finally, the programmer enters "1" into the BEGIN WITH ITEM configuration field 2810 setting variable [begin]=1. The process is repeated for each item. It should be appreciated that any number of Push Buttons can be easily added to the generic control system 2600 using the main control program 2602 and the Virtual Rack module 2604.

From the above discussion, it can be appreciated that a generic control system is created by the addition of the Virtual Rack module. In addition, the configuration screens of the Virtual Rack module provides a user-friendly interface between the programming terminal and the PLC. The configuration screens allow the programmer to easily configure and monitor the various I/O module types independent of where and when the I/O module types were installed in the PLC, rather than during programming of the main control program as in conventional PLC control systems.

While this invention has been described in conjunction with specific embodiments, it is evident that many alternatives, modifications and variations will be apparent to those skilled in the art. Accordingly, the preferred embodiments of the invention as set forth herein are intended to be illustrative, rather than limiting. Various changes may be made without departing from the spirit and scope of the invention as defined in the following claims.

What is claimed is:

1. A method of using a Virtual Rack module, comprising the steps of:

installing an executable code containing a main control program and a Virtual Rack module in a programmable logic controller;

configuring at least one module type connected to the programmable logic controller during runtime by using at least one configuration screen generated by the Virtual Rack module, whereby the Virtual Rack module allows the selected module type to be configured independent of when and where the at least one module type was installed in the programmable logic controller without creating a different executable code.

2. The method of claim 1 further comprising the step of selecting a slot to be configured in said configuration step by clicking on a slot number display box located on the at least one configuration screen generated by the Virtual Rack module.

3. The method of claim 1 further comprising the step of selecting the at least one module type by clicking on a radio button located on the at least one configuration screen generated by the Virtual Rack module.

4. The method of claim 1 further comprising the step of activating the at least one module type by clicking on a change slot type button located on the at least one configuration screen generated by the Virtual Rack module.

5. The method of claim 1, wherein the at least one configuration screen generated by the Virtual Rack module comprises a configuration screen for a Digital Input module type.

6. The method of claim 5, wherein the at least one configuration screen for the Digital Input module type includes at least one of a channel number reference, a polarity and a state configuration field.

7. The method of claim 1, wherein the at least one configuration screen generated by the Virtual Rack module comprises a configuration screen for a Digital Output module type.

8. The method of claim 7, wherein the at least one configuration screen for the Digital Output module type includes at least one of a channel number reference, a state and a force configuration field.

9. The method of claim 1, wherein the at least one configuration screen generated by the Virtual Rack module comprises a configuration screen for an Analog Input module type.

10. The method of claim 9, wherein the at least one configuration screen for the Analog Input module type includes at least one of a channel number reference, a Low R, a High R, a factor, and a value configuration field.

11. The method of claim 1, wherein the at least one configuration screen generated by the Virtual Rack module comprises a configuration screen for an Analog Output module type.

12. The method of claim 11, wherein the at least one configuration screen for the Analog Output module type includes at least one of a channel number reference, a low R, a high R, a force analog and a value configuration field.

13. The method of claim 12, wherein the force analog configuration screen generated by the Virtual Rack module includes sliders for allowing a programmer to check operation of a field device by directly forcing a current signal to the field device and displaying a current output of the field device.

14. The method of claim 1, wherein the at least one configuration screen generated by the Virtual Rack module comprises a configuration screen for a Flex Analog Output module type.

15. The method of claim 14, wherein the at least one configuration screen for the Flex Analog Output module type includes at least one of a channel number reference, a low R, a high R, a force analog and a value configuration field.

16. The method of claim 15, wherein the force analog configuration screen generated by the Virtual Rack module includes sliders for allowing the programmer to check operation of a field device by directly forcing a current signal to the field device and displaying a current output of the field device.

17. The method of claim 1, wherein the at least one configuration screen generated by the Virtual Rack module comprises a configuration screen for a 16/16 Block module type.

18. The method of claim 17, wherein the at least one configuration screen for the 16/16 Block module type includes at least one of a channel number reference, a polarity, a state configuration field in an input section of the 16/16 Block module type, and at least one of a state and a force configuration field in an output section of the 16/16 Block module type.

19. The method of claim 1, wherein the at least one configuration screen generated by the Virtual Rack module comprises a configuration screen for a VHSC module type.

20. The method of claim 19, wherein the at least one configuration screen for the VHSC module type includes at least one of a channel number reference, a counter total display, an On Latch, an Off Latch, an Enable Output, a counter mode, a counter reset and a rollover configuration field.

21. A method of operating a programmable logic controller to create a generic control system by using a Virtual Rack module, comprising the steps of:

creating a main control program and a Virtual Rack module using a programming terminal connected to the programmable logic controller;

compiling the main control program and the Virtual Rack module to create an executable code; and downloading the executable code from the programming terminal into the programmable logic controller, whereby the Virtual Rack module creates a generic control system when called by the main control program and allows a user to configure at least one module type connected to the programmable logic controller during runtime independent of where and when the at least one module type was connected to the programmable logic controller without creating a different executable code.

22. The method of claim 21, wherein the main control program and the Virtual Rack module are created using a programming language understandable by the programmable logic controller.

23. The method of claim 22, wherein the programming language comprises relay ladder logic programming language.

24. A method of creating a generic control system, the method comprising the steps of:

downloading an executable code including a main control program and a Virtual Rack module into a memory of a programmable device;

selecting at least one module type connected to the programmable device by using a configuration screen generated by the Virtual Rack module; and configuring the at least one module type during runtime using the configuration screen generated by the Virtual Rack module without creating a different executable code.

25. A method of creating a generic control system in a programmable logic controller by using a Virtual Rack module, comprising the steps of:

programming a ladder logic program to create an executable code containing a software engine for the generic control system;

creating a configuration screen for configuring the software engine; and using the configuration screen for assigning channel numbers in the Virtual Rack module to addresses in the programmable logic controller during runtime without creating a different executable code.

26. An apparatus for creating a generic control system by using a Virtual Rack module, comprising:

a programming terminal having a data storage device for storing a set of program instructions compiled from a main control program that includes a Virtual Rack module;

a programmable device connected to said programming computer, said programmable device including a memory for storing the set of program instructions from said programming terminal and a microprocessor for processing the set of program instructions stored in the memory, wherein said generic control system allows configuration of at least one module type connected to the programmable device during runtime without creating a different set of program instructions.

27. The apparatus according to claim 26, wherein the memory of said programmable logic controller comprises an electronically erasable programmable read-only memory.

28. The apparatus according to claim 26, further comprising at least one module type installed in a slot of said programmable logic controller.

29. The apparatus according to claim 28, wherein said at least one module type comprises a Digital Input module type.

30. The apparatus according to claim 28, wherein said at least one module type comprises a Digital Output module type.

31. The apparatus according to claim 28, wherein said at least one module type comprises a Analog Input module type.

32. The apparatus according to claim 28, wherein said at least one module type comprises a Analog Output module type.

33. The apparatus according to claim 28, wherein said at least one module type comprises a Flex Analog Output module type.

34. The apparatus according to claim 28, wherein said at least one module type comprises a 16/16 Block module type.

35. The apparatus according to claim 28, wherein said at least one module type comprises a VHSC module type.

* * * * *